(12) United States Patent
McClellan et al.

(10) Patent No.: US 9,311,629 B2
(45) Date of Patent: *Apr. 12, 2016

(54) INFORMATION MANAGEMENT PROBLEM INITIATIVE SYSTEM

(75) Inventors: Timothy McClellan, Richmond, VA (US); William Cather Steincamp, II, Cumberland, VA (US); Kelley Hullett LeRow, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 584 days.

This patent is subject to a terminal disclaimer.

(21) Appl. No.: 13/027,955

(22) Filed: Feb. 15, 2011

(65) Prior Publication Data

US 2012/0210248 A1 Aug. 16, 2012

(51) Int. Cl.
| | |
|---|---|
| *G06F 3/01* | (2006.01) |
| *G06F 15/16* | (2006.01) |
| *G06Q 10/00* | (2012.01) |
| *G06Q 10/06* | (2012.01) |
| *G06Q 10/10* | (2012.01) |

(52) U.S. Cl.
CPC .............. *G06Q 10/20* (2013.01); *G06Q 10/06* (2013.01); *G06Q 10/101* (2013.01)

(58) Field of Classification Search
CPC .................. G06F 3/01; G06F 15/16
USPC ........................ 715/752, 753, 700
See application file for complete search history.

(56) References Cited

U.S. PATENT DOCUMENTS

| | | | | |
|---|---|---|---|---|
| 2002/0029167 | A1* | 3/2002 | Muller | 705/14 |
| 2002/0130904 | A1* | 9/2002 | Becker et al. | 345/753 |
| 2008/0115070 | A1* | 5/2008 | Whitney et al. | 715/764 |
| 2008/0126480 | A1* | 5/2008 | Hintermeister et al. | 709/204 |
| 2009/0006549 | A1 | 1/2009 | Singh et al. | |
| 2010/0077317 | A1* | 3/2010 | Kritt et al. | 715/752 |

* cited by examiner

*Primary Examiner* — Tadeese Hailu
*Assistant Examiner* — Darrin Hope
(74) *Attorney, Agent, or Firm* — Michael A. Springs; Moore & Van Allen PLLC; Patrick B. Horne

(57) ABSTRACT

A system and method manages information relating to a problem definition initiative in order to communicate some or all the information users. The method includes providing an interface users at workstations accessible by one or more of the users, receiving information comprising a plurality of messages from users communicating via the workstations during a problem definition initiative session, initiating display of at least one of the plurality of messages to the users via the interface, logging event data related to a plurality of events associated with the problem definition initiative session, and initiating display of at least some of the event data to the users via the interface.

44 Claims, 25 Drawing Sheets

TMS
INCIDENT AND CHANGE PORTAL
ROLE: INCIDENT MANAGER 11:45:17 PM

WORKPLAN CREATOR

| CHANGE #: | |
| --- | --- |
| DESCRIPTION: | |
| PRIMARY CONTACT: | |
| SECONDARY CONTACT: | |
| ESCALATION CONTACT: | |
| EXPECTED START TIME: | 01/13/2011 12:00 AM |
| EXPECTED END TIME: | 01/13/2011 12:00 AM |
| ACTUAL START TIME: | 01/13/2011 12:00 AM |
| ACTUAL END TIME: | 01/13/2011 12:00 AM |
| PREDICTED IMPACTS: | |
| PLAN TYPE: | ●WORK PLAN |
| UPLOAD CSV: | [BROWSE] [TEMPLATE] |
| | [RESET] [SUBMIT] |

FEEDBACK

FIG. 6E

IMS

ROLE: INCIDENT MANAGER 11:48:13 AM

HOME  WORKPLAN  INCIDENT ▸ RELEASE

FEEDBACK

| | EXPECTED START DATE TIME | FROM MM/DD/YYYY/HH:MM | TO MM/DD/YYYY/HH:MM | EXPECTED END DATE TIME | FROM MM/DD/YYYY/HH:MM | TO MM/DD/YYYY/HH:MM | VIEW BY ALL TASKS |
|---|---|---|---|---|---|---|---|
| | ACTUAL START DATE TIME | FROM MM/DD/YYYY/HH:MM | TO MM/DD/YYYY/HH:MM | ACTUAL END DATE TIME | FROM MM/DD/YYYY/HH:MM | TO MM/DD/YYYY/HH:MM | SEARCH |

EXPORT TO EXCEL

☐ OVERDUE CHARGE

| | CHARGE | DESCRIPTION | STATUS | COMMUNICATION COMMENTS | TOTAL TASKS | TOTAL TASKS OUTSTANDING | TOTAL MILESTONES | TOTAL MILESTONES OUTSTANDING | EXPECTED START DATE TIME | ACTUAL START DATE TIME | EXPECTED END DATE TIME | ACTUAL END DATE TIME |
|---|---|---|---|---|---|---|---|---|---|---|---|---|
| ☐ IPAN | * | NEW CHANGE | STARTED | T | 2 | 0 | 0 | 0 | 10-26-2010 00:00 AM | 10-26-2010 00:00 AM | 10-26-2010 00:00 AM | 10-26-2010 00:00 AM |
| ☐ IPAN | * | F5 | WAITING | T | 11 | 11 | 10 | 10 | 10-26-2010 00:00 AM | 10-26-2010 00:00 AM | 10-26-2010 00:00 AM | 10-26-2010 00:00 AM |
| ☐ IPAN | * | TESTING | STARTED | T | 6 | 0 | 6 | 0 | 9-16-2010 00:00 AM | | 9-02-2010 00:00 AM | |
| ☐ IPAN | * | XXXX DESC | NOT STARTED | T | 2 | 0 | 0 | 0 | 11-01-2010 00:00 AM | 11-01-2010 00:00 AM | 11-01-2010 00:00 AM | 11-01-2010 00:00 AM |
| ☐ IPAN | * | XXXX | STARTED | T | 1 | 0 | 1 | 0 | 11-01-2010 00:00 AM | 11-01-2010 00:00 AM | 11-01-2010 00:00 AM | 11-01-2010 00:00 AM |
| ☐ IPAN | * | XXXX | STARTED | T | 3 | 0 | 2 | 0 | 11-02-2010 00:00 AM | 11-02-2010 00:00 AM | 11-02-2010 00:00 AM | 11-02-2010 00:00 AM |
| ☐ IPAN | * | XXXX | STARTED | T | 4 | 0 | 3 | 0 | 11-02-2010 00:00 AM | 11-02-2010 00:00 AM | 11-02-2010 00:00 AM | 11-02-2010 00:00 AM |

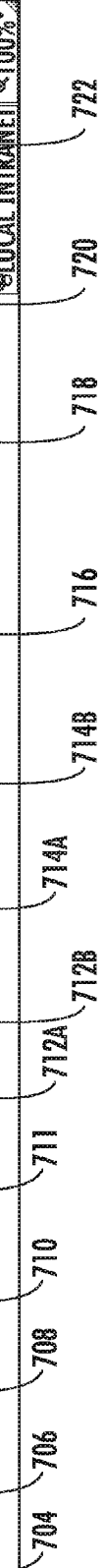
FIG. 7A.2

FIG. 7D

IMS
INCIDENT AND CHANGE PORTAL
FEEDBACK

HOME  WORKPLAN ▸ INCIDENT ▸  RELEASE ▸
PLAN LOADER  TASK EDITOR  DTSUMMARY  EVENT SUMMARY  EVENT MANAGEMENT  ROLEPERMISSION       TASKID [      ]   SEARCH

IMS ▸ RELEASE ▸ EVENT MANAGEMENT

EVENT LISTING

SELECT AN EVENT OR CLICK "ADD NEW"

| EVENT NAME | TYPE | START DATE | STATUS |
|---|---|---|---|
| TEST 1 | INTEGRATED | 1/26/2011 12:00:00 AM | ACTIVE |
| TEST 2 | INTEGRATED | 1/25/2011 12:00:00 AM | ACTIVE |
| TEST 3 | INTEGRATED | 1/29/2011 12:00:00 AM | ACTIVE |
| TEST 4 | INTEGRATED | 1/5/2011 12:00:00 AM | ACTIVE |
| TEST 5 | INTEGRATED | 1/13/2011 12:00:00 AM | ACTIVE |
| TEST 6 | INDEPENDENT | 1/10/2011 6:00:00 PM | ACTIVE |

ADD NEW

GENERAL INFORMATION

VIEW HISTORY

| EVENT NAME* | TEST 5 |
| MONTH | JANUARY |
| YEAR | 2011 |
| TYPE | INTEGRATED |
| DEPLOYMENT START | 01/13/2011 12:00 AM |
| DEPLOYMENT END | 01/21/2011 12:00 AM |

☐ DTS LOCKDOWN
☑ ACTIVE EVENT

DOMAIN INFORMATION

| DOMAIN NAME | IS ACTIVE | REMOVE |
|---|---|---|
| ATM | ☑ | ☐ |
| BANKING CENTER | ☑ | ☐ |
| CARD | ☑ | ☐ |
| DEPOSITS | ☑ | ☐ |
| ECOMMERCE (OLB) | ☑ | ☐ |
| HI&I | ☑ | ☐ |

DOMAIN NAME [ATM ▼]

NOTIFICATIONS SETTINGS BY CONTACT

| PRIMARY | 10 ▼ |
| SECONDARY | 20 ▼ |
| ESCALATION | 30 ▼ |
| REPEAT ESCALATION | 40 ▼ |

☐ DISABLE ALL NOTIFICATIONS
RECEIVING EMAIL CC'S
[NAME@DOMAIN.COM]

REMOVE SELECTED

*FIG. 7E*

FIG. 7F

# INFORMATION MANAGEMENT PROBLEM INITIATIVE SYSTEM

FIELD

In general, embodiments of the invention relate to systems for information management. More specifically, embodiments of the invention relate to systems for information management related to a problem definition initiative.

BACKGROUND

In recent history, teleconferencing has become possible, and even relatively affordable, across continents and among large numbers of participants. In large organizations, particularly during line of business-wide or even organization-wide initiatives, such teleconferences can cover a broad and deep range of topics, such as addressing potential problems facing lines of business within the organization or the organization as a whole. As a result, organizational teleconferences often require participation from many different lines of business within an organization, and in some instances require participation from many individuals within a line of business representing differing levels of management responsibility.

Similar to the field of teleconferencing is the somewhat newer area of textual chatting via the Internet. Chat rooms provide a conduit for individuals to communicate with one another, generally concerning a pre-defined topic of discussion. For example, an Internet chat room may provide individuals an opportunity to post messages regarding their favorite sports team for consideration and response from other individuals participating in the same chat room.

However, neither modern teleconferencing nor modern chatting technologies provide an interface for individuals participating in completed, ongoing or future problem initiative, change initiative or organization-wide, multiple change initiative projects. Neither do modern teleconferencing or chatting technologies provide an interface for relating information through which the individual can quickly and easily ascertain the status of the project. For these and other reasons, an interface configured for providing numerous supplemental functions such as, for example, initiating display of the status of an ongoing issue discussed during the teleconference, is needed.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

According to embodiments of the invention a method for managing information that relates to a problem definition initiative in order to communicate some or all the information to a plurality of users includes providing an interface, using a processing device, to a plurality of users at a plurality of workstations accessible by one or more of the users, receiving information comprising a plurality of messages from users communicating via the workstations during a problem definition initiative session, initiating display of at least one of the plurality of messages to the users via the interface, logging event data related to a plurality of events associated with the problem definition initiative session, and initiating display of at least some of the event data to the users via the interface.

In some embodiments, the event data comprises data corresponding to one or more of the messages received from the users. In some embodiments, the interface comprises a first panel and a second panel, the first panel configured for displaying at least some of the event data and the second panel configured for displaying at least one of the plurality of messages. In some embodiments, the plurality of messages comprises a dialogue among the plurality of users and wherein the event data corresponds to information about the dialogue, wherein logging the event data comprises logging data related to the dialogue and wherein initiating display of at least some of the event data comprises initiating display of at least a portion of the logged dialogue. In some embodiments, the method also includes archiving at least a portion of the logged event data, wherein the archived data is configured as searchable and retrievable data.

In some embodiments, the method also includes initiating communication of an alert comprising information corresponding to an event related to logged event data. In some such embodiments, initiating communication comprises one of initiating a pager alert, initiating a text message alert, initiating an email alert, initiating social media status update, or initiating a social media message.

In some embodiments, the method also includes initiating preparation of a report based at least in part on at least a portion of the logged event data or at least one of the received messages. In some embodiments, the method also includes initiating a second interface in response to a request from a user, the second interface configured for receiving a plurality of messages from one or more of the plurality of users. In some embodiments, the interface comprises a first panel and a second panel, the first panel configured for displaying at least one of the plurality of messages and the second panel configured for displaying a list of users participating in the conference session.

In some embodiments, the interface comprises a first panel, a second panel and a third panel, the first panel configured for displaying at least some of the event data, the second panel configured for displaying at least one of the plurality of messages, and the third panel configured for displaying a list of users participating in the conference session. In some such embodiments, the first panel is disposed on the left-hand side of the second panel and the third panel is disposed on the right-hand side of the second panel.

In some embodiments, the method also includes retrieving archived data from a database in response to a request from a user participating in the conference session, the archived data corresponding to a previously conducted conference session.

In some embodiments, the method also includes logging session data related to the conference session and initiating display of at least some of the session data via the interface. In some such embodiments, the session data comprises data corresponding to an identification of a problem being addressed by the conference session, a status of the problem being addressed by the conference session, or a status of one or more solutions or solution steps proposed to address the problem. In some of those embodiments, the method also includes initiating preparation of a report based at least in part on at least a portion of the data corresponding to an identification of a problem being addressed by the conference session, a status of the problem being addressed by the conference session, or a status of one or more solutions or solution steps proposed to address the problem.

According to embodiments of the invention, a system manages information relating to a problem definition initiative in order to communicate some or all the information to a plurality of users and has a processing device. The processing device is configured for providing an interface to a plurality of users at a plurality of workstations accessible by one or more of the users, receiving information comprising a plurality of messages from users communicating via the workstations during a problem definition initiative session, initiating display of at least one of the plurality of messages to the users via the interface, logging event data related to a plurality of events associated with the problem definition initiative session, and initiating display of at least some of the event data to the users via the interface.

In some embodiments, the event data comprises data corresponding to one or more messages received from one or more users. In some embodiments, the interface comprises a first panel and a second panel, the first panel configured for displaying at least some of the event data and the second panel configured for displaying at least one of the plurality of messages. In some embodiments, the plurality of messages comprises a dialogue among the plurality of users and wherein the event data corresponds to information about the dialogue, wherein logging the event data comprises logging data related to the dialogue and wherein initiating display of at least some of the event data comprises initiating display of at least a portion of the logged dialogue. In some embodiments, the processing device is further configured for archiving at least a portion of the logged event data, wherein the archived data is configured as searchable and retrievable data.

In some embodiments, the processing device is further configured for initiating communication of an alert comprising information corresponding to an event related to logged event data. In some such embodiments, initiating communication comprises one of initiating a pager alert, initiating a text message alert, initiating an email alert, initiating social media status update, or initiating a social media message.

In some embodiments, the processing device is further configured for initiating preparation of a report based at least in part on at least a portion of the logged event data or at least one of the received messages. In some embodiments, the processing device is further configured for initiating a second interface in response to a request from a user, the second interface configured for receiving a plurality of messages from one or more of the plurality of users. In some embodiments, the interface comprises a first panel and a second panel, the first panel configured for displaying at least one of the plurality of messages and the second panel configured for displaying a list of users participating in the conference session.

In some embodiments, the interface comprises a first panel, a second panel and a third panel, the first panel configured for displaying at least some of the event data, the second panel configured for displaying at least one of the plurality of messages, and the third panel configured for displaying a list of users participating in the conference session. In some such embodiments, the first panel is disposed on the left-hand side of the second panel and the third panel is disposed on the right-hand side of the second panel.

In some embodiments, the processing device is further configured for retrieving archived data from a database in response to a request from a user participating in the conference session, the archived data corresponding to a previously conducted conference session.

In some embodiments, the processing device is further configured for logging session data related to the conference session and initiating display of at least some of the session data via the interface. In some such embodiments, the session data comprises data corresponding to an identification of a problem being addressed by the conference session, a status of the problem being addressed by the conference session, or a status of one or more solutions or solution steps proposed to address the problem. In some such embodiments, the processing device is further configured for initiating preparation of a report based at least in part on at least a portion of the data corresponding to an identification of a problem being addressed by the conference session, a status of the problem being addressed by the conference session, or a status of one or more solutions or solution steps proposed to address the problem.

According to embodiments of the invention, a computer program product includes a non-transient computer-readable memory having computer-executable instructions for use in information management relating to a problem definition initiative. The instructions include instructions for providing an interface to a plurality of users at a plurality of workstations accessible by one or more of the users, instructions for receiving information comprising a plurality of messages from users communicating via the workstations during a problem definition initiative session, instructions for initiating display of at least one of the plurality of messages to the users via the interface, instructions for logging event data related to a plurality of events associated with the problem definition initiative session, and instructions for initiating display of at least some of the event data to the users via the interface.

In some embodiments, the event data comprises data corresponding to one or more messages received from one or more users. In some embodiments, the interface comprises a first panel and a second panel, the first panel configured for displaying at least some of the event data and the second panel configured for displaying at least one of the plurality of messages. In some embodiments, the plurality of messages comprises a dialogue among the plurality of users and wherein the event data corresponds to information about the dialogue, wherein the instructions for logging the event data comprise instructions for logging data related to the dialogue and wherein the instructions for initiating display of at least some of the event data comprise instructions for initiating display of at least a portion of the logged dialogue. In some embodiments, the instructions further comprise instructions for archiving at least a portion of the logged event data, wherein the archived data is configured as searchable and retrievable data.

In some embodiments, the instructions further comprise instructions for initiating communication of an alert comprising information corresponding to an event related to logged event data. In some such embodiments, the instructions for initiating communication comprise one of instructions for initiating a pager alert, instructions for initiating a text message alert, instructions for initiating an email alert, instructions for initiating social media status update, or instructions for initiating a social media message.

In some embodiments, the instructions further comprise instructions for initiating preparation of a report based at least in part on at least a portion of the logged event data or at least one of the received messages. In some embodiments, the instructions further comprise instructions for initiating a second interface in response to a request from a user, the second interface configured for receiving a plurality of messages from one or more of the plurality of users. In some embodiments, the interface comprises a first panel and a second panel, the first panel configured for displaying at least one of the plurality of messages and the second panel configured for displaying a list of users participating in the conference session.

In some embodiments, the interface comprises a first panel, a second panel and a third panel, the first panel configured for displaying at least some of the event data, the second panel configured for displaying at least one of the plurality of messages, and the third panel configured for displaying a list of user participating in the conference session. In some such embodiments, the first panel is disposed on the left-hand side of the second panel and the third panel is disposed on the right-hand side of the second panel.

In some embodiments, the instructions further comprise instructions for retrieving archived data from a database in response to a request from a user participating in the conference session, the archived data corresponding to a previously conducted conference session.

In some embodiments, the instructions further comprise instructions for logging session data related to the conference session and initiating display of at least some of the session data via the interface. In some such embodiments, the session data comprises data corresponding to an identification of a problem being addressed by the conference session, a status of the problem being addressed by the conference session, or a status of one or more solutions or solution steps proposed to address the problem. In some of those embodiments, the instructions further comprise instructions for initiating preparation of a report based at least in part on at least a portion of the data corresponding to an identification of a problem being addressed by the conference session, a status of the problem being addressed by the conference session, or a status of one or more solutions or solution steps proposed to address the problem.

According to embodiments of the invention, a method for managing information relating to a problem definition initiative in order to communicate some or all the information to a plurality of users includes receiving a plurality of messages from a plurality of users communicating via a plurality of workstations during a problem definition initiative session, the plurality of messages comprising a dialogue among the plurality of users and initiating, by a processing device, an interface to one or more of the plurality of users. Initiating the interface includes initiating display of at least one of the plurality of messages via the interface. The method also includes logging event data related to a plurality of events associated with the problem definition initiative session, the event data comprising data corresponding to one or more messages received from one or more users during the dialogue, logging session data comprising data corresponding to an identification of a problem being addressed by the conference session, a status of the problem being addressed by the conference session, or a status of one or more solutions or solution steps proposed to address the problem, and archiving at least a portion of the logged event data, wherein the archived data is configured as searchable and retrievable data. Initiating the interface also includes initiating display of at least some of the event data and at least some of the session data via the interface.

In some embodiments, the method also includes initiating communication of an alert comprising information corresponding to an event related to logged event data. In some such embodiments, initiating communication comprises one of initiating a pager alert, initiating a text message alert, initiating an email alert, initiating social media status update, or initiating a social media message.

In some embodiments, the method also includes initiating preparation of a report based at least in part on at least a portion of the logged event data or at least one of the received messages. In some embodiments, the method also includes initiating a second interface in response to a request from a user, the second interface configured for receiving a plurality of messages from one or more of the plurality of users. In some embodiments, the interface comprises a first panel, a second panel and a third panel, the first panel configured for displaying at least some of the event data, the second panel configured for displaying at least one of the plurality of messages, and the third panel configured for displaying a list of users participating in the conference session. In some embodiments, the method also includes initiating preparation of a report based at least in part on at least a portion of the data corresponding to an identification of a problem being addressed by the conference session, a status of the problem being addressed by the conference session, or a status of one or more solutions or solution steps proposed to address the problem.

According to embodiments of the invention, a system for managing information relating to a problem definition initiative has a processing device. The processing device is configured for receiving a plurality of messages from a plurality of users communicating via a plurality of workstations during a problem definition initiative session, the plurality of messages comprising a dialogue among the plurality of users and initiating an interface to one or more of the plurality of users. Initiating the interface includes initiating display of at least one of the plurality of messages via the interface. The processing device is further configured for logging event data related to a plurality of events associated with the problem definition initiative conference session, the event data comprising data corresponding to one or more messages received from one or more users during the dialogue, logging session data comprising data corresponding to an identification of a problem being addressed by the conference session, a status of the problem being addressed by the conference session, or a status of one or more solutions or solution steps proposed to address the problem, and archiving at least a portion of the logged event data, wherein the archived data is configured as searchable and retrievable data. Initiating presentation of the interface includes initiating display of at least some of the event data and at least some of the session data via the interface.

In some embodiments, the processing device is further configured for initiating communication of an alert comprising information corresponding to an event related to logged event data. In some embodiments, initiating communication comprises one of initiating a pager alert, initiating a text message alert, initiating an email alert, initiating social media status update, or initiating a social media message. In some embodiments, the processing device is further configured for initiating preparation of a report based at least in part on at least a portion of the logged event data or at least one of the received messages. In some embodiments, the processing device is further configured for initiating a second interface in response to a request from a user, the second interface configured for receiving a plurality of messages from one or more of the plurality of users. In some embodiments, the interface comprises a first panel, a second panel and a third panel, the first panel configured for displaying at least some of the event data, the second panel configured for displaying at least one of the plurality of messages, and the third panel configured for displaying a list of users participating in the conference session. In some embodiments, the processing device is further configured for initiating preparation of a report based at least in part on at least a portion of the data corresponding to an identification of a problem being addressed by the conference session, a status of the problem being addressed by the conference session, or a status of one or more solutions or solution steps proposed to address the problem.

The following description and the annexed drawings set forth in detail certain illustrative features of one or more embodiments of the invention. These features are indicative, however, of but a few of the various ways in which the principles of various embodiments may be employed, and this description is intended to include all such embodiments and their equivalents.

BRIEF DESCRIPTION OF THE DRAWINGS

Figure 1A:
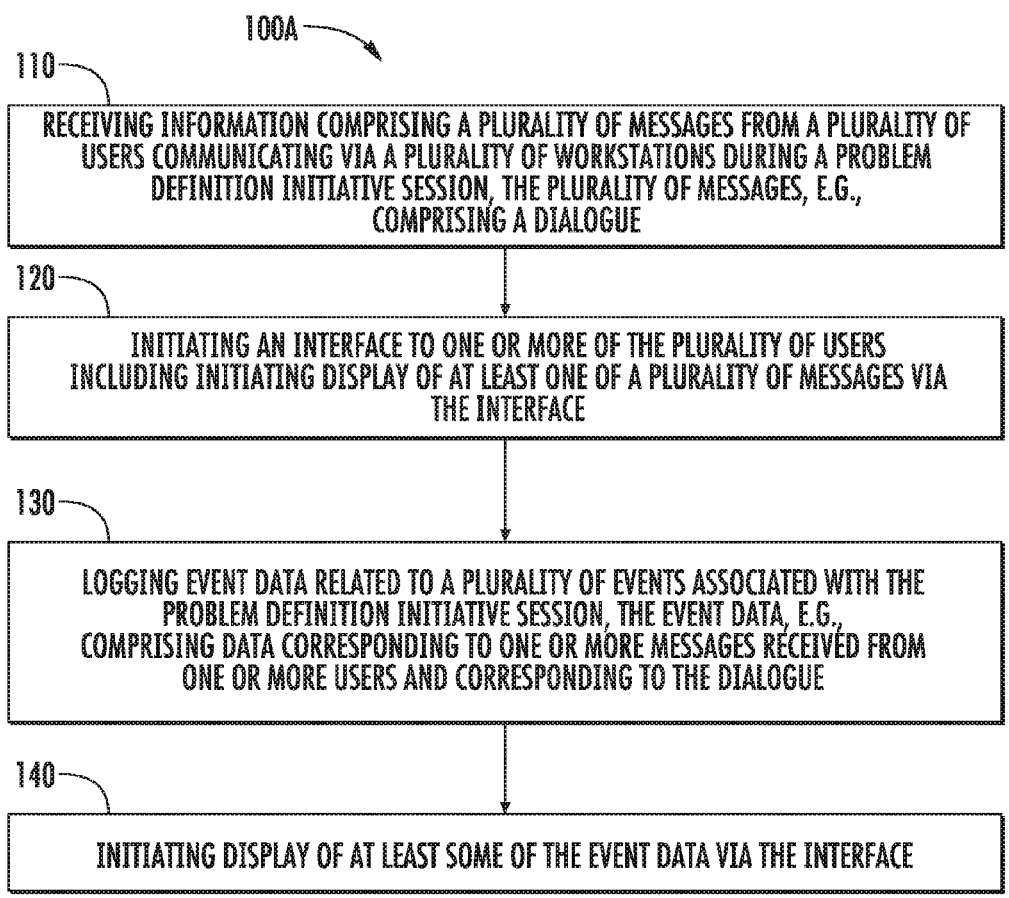
Figure 1B:
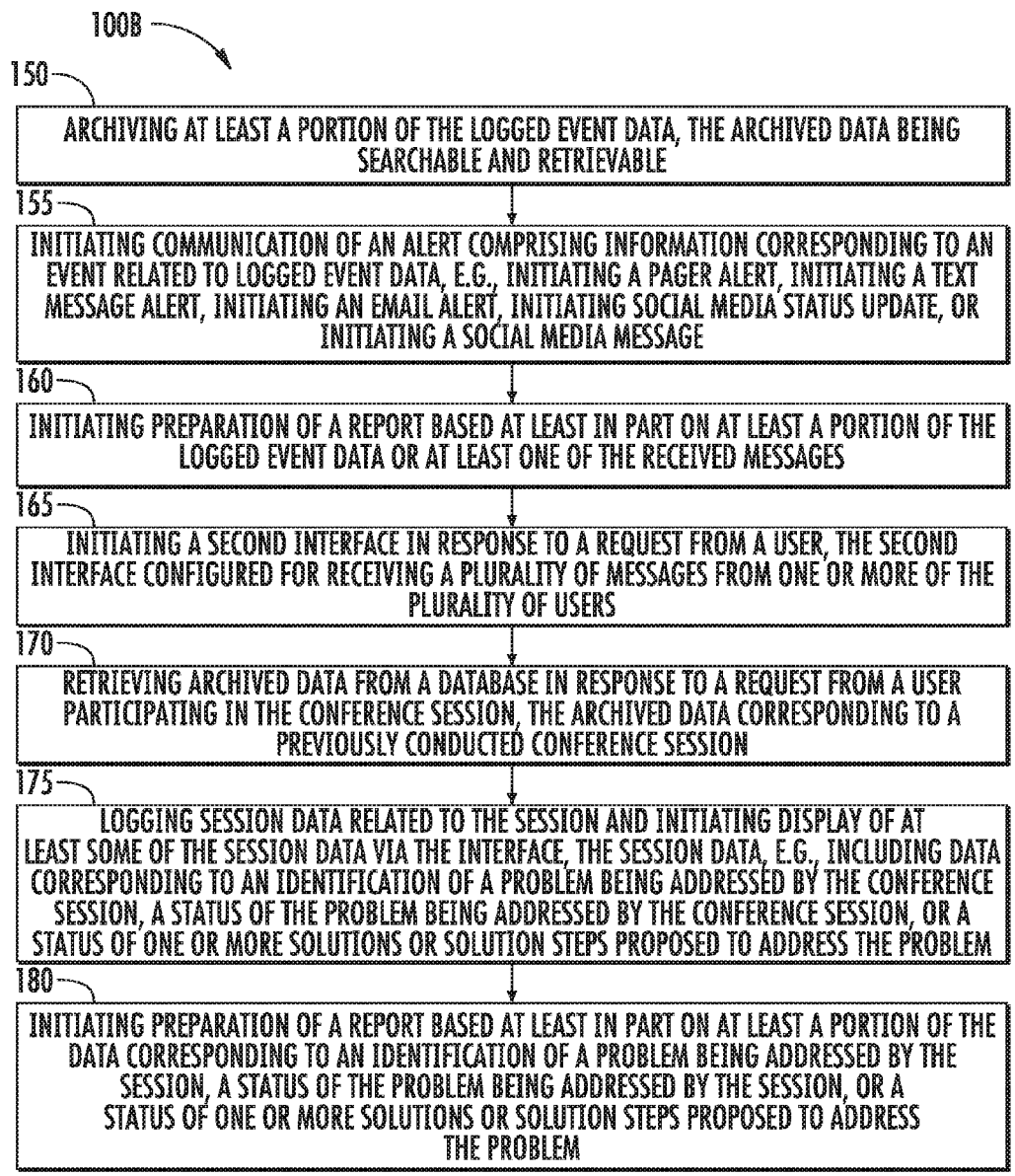
Figure 2A:
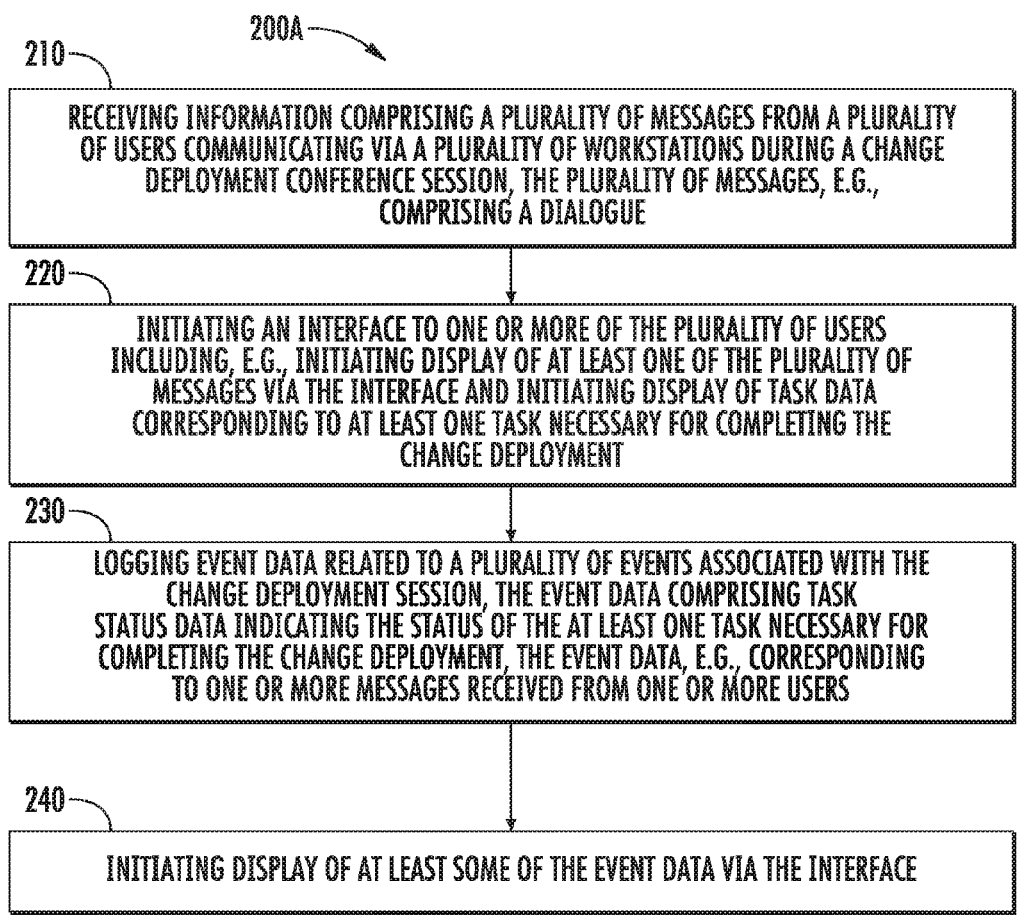
Figure 2B:
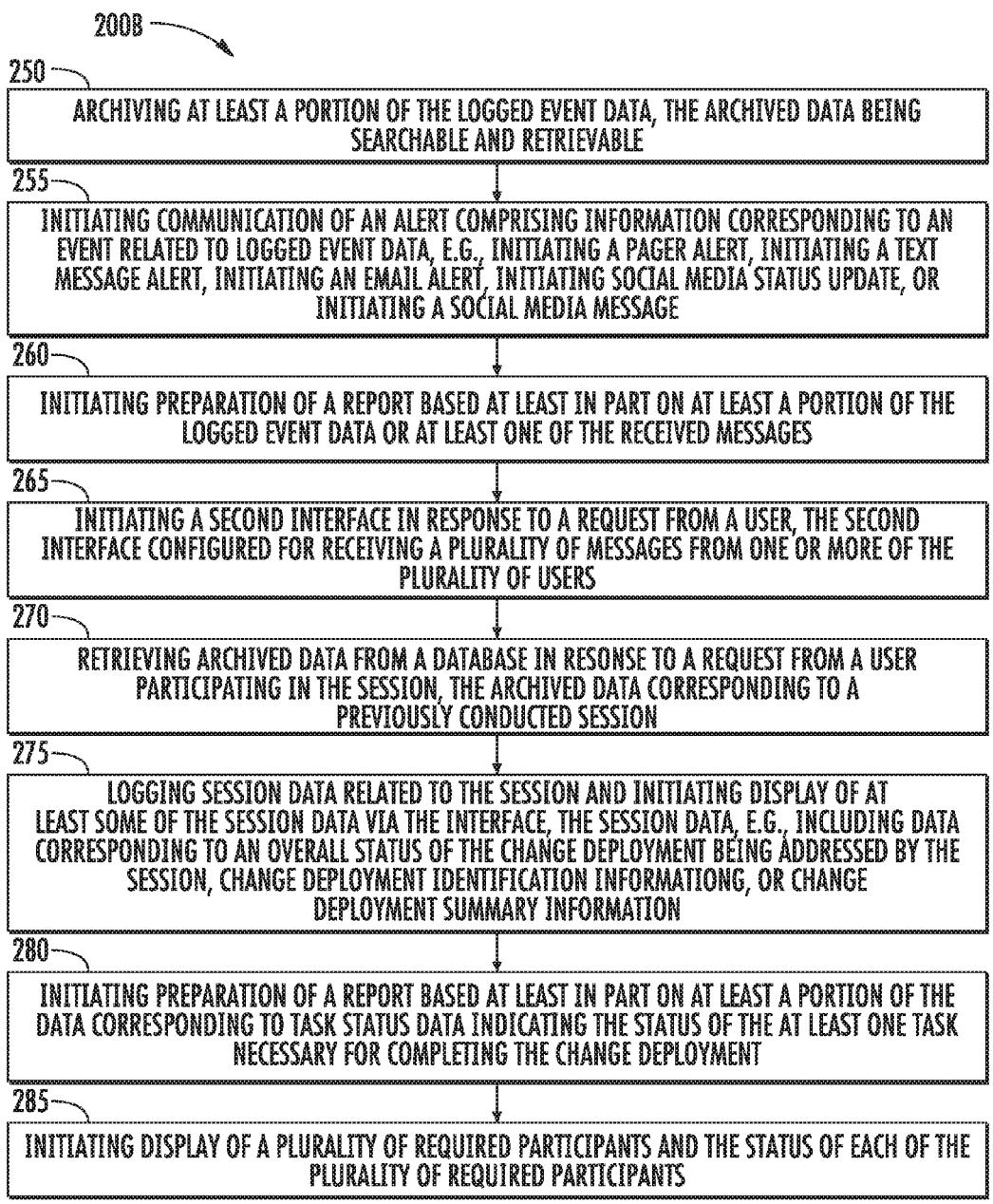
Figure 3A:
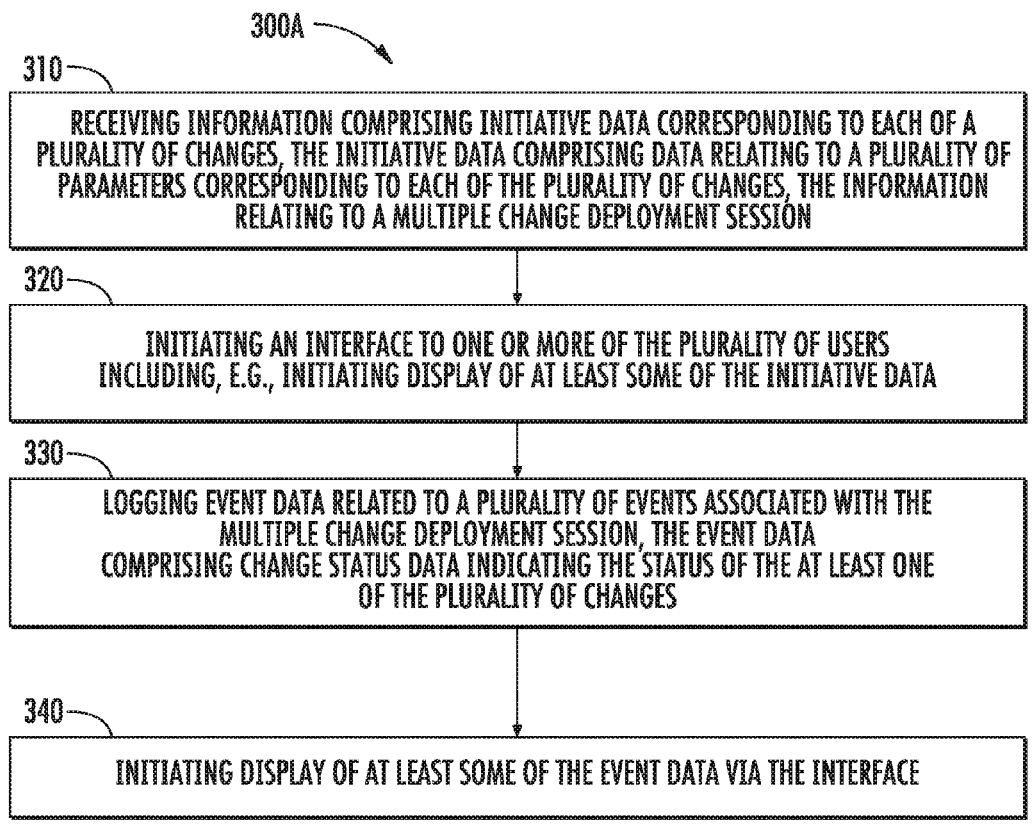
Figure 3B:
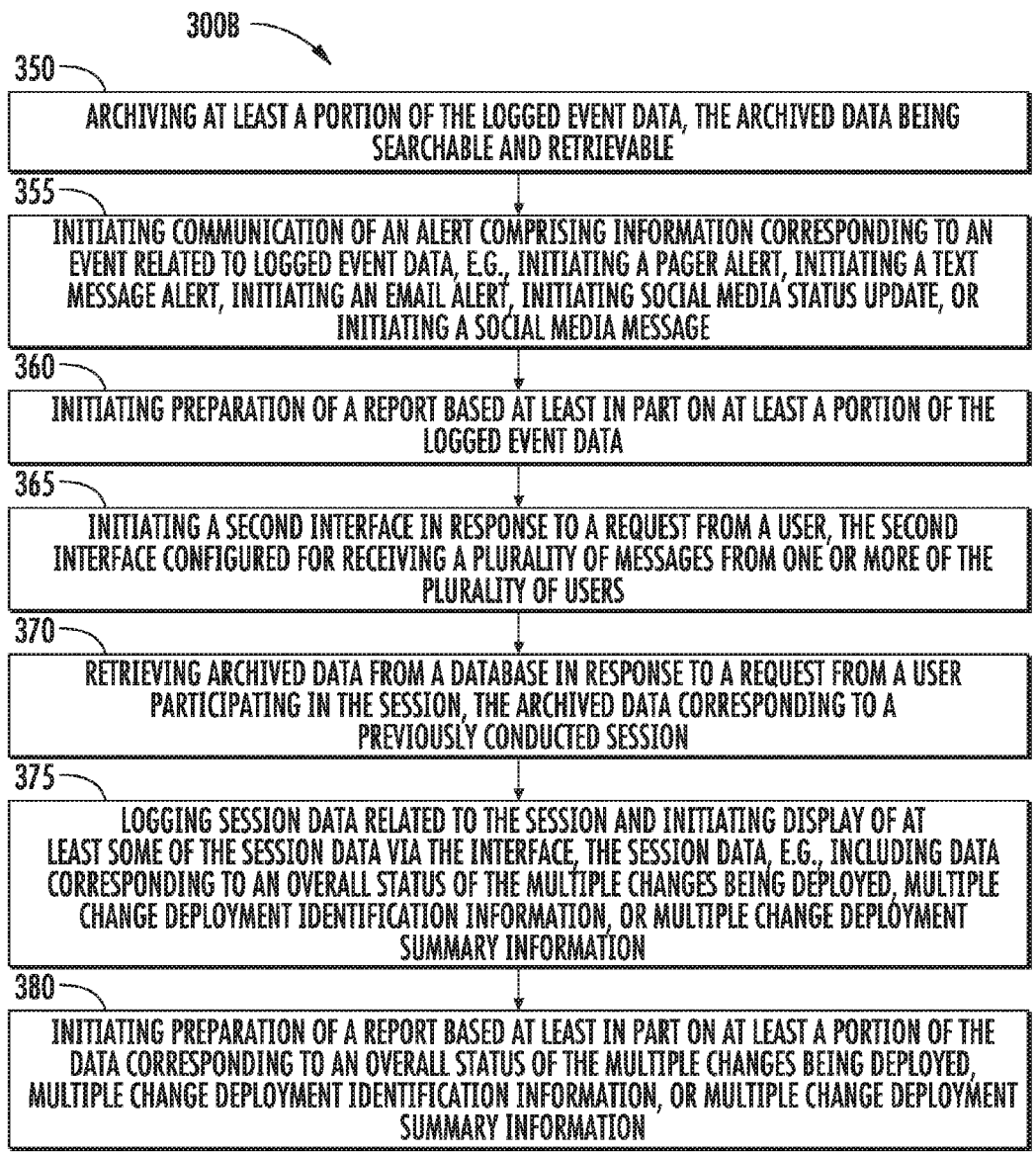
Figure 3C:
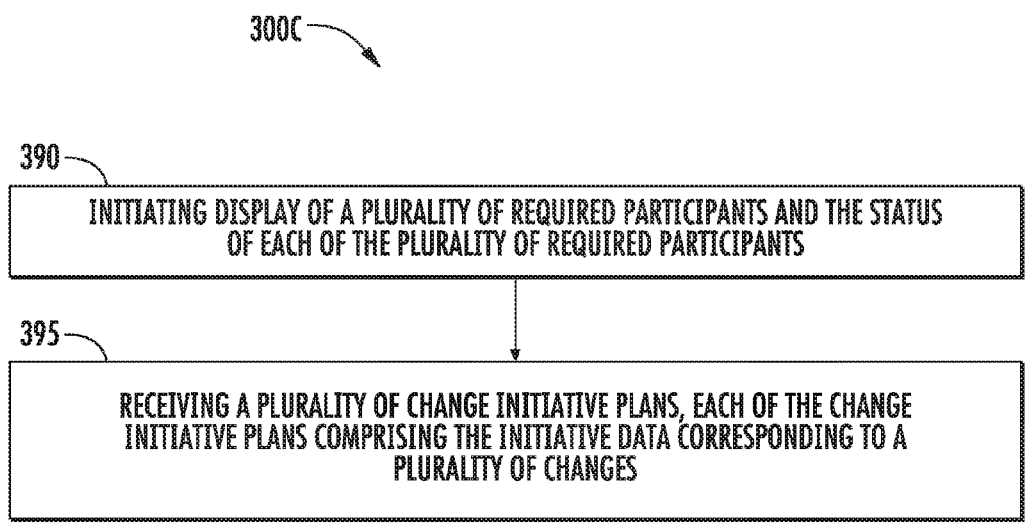
Figure 4:
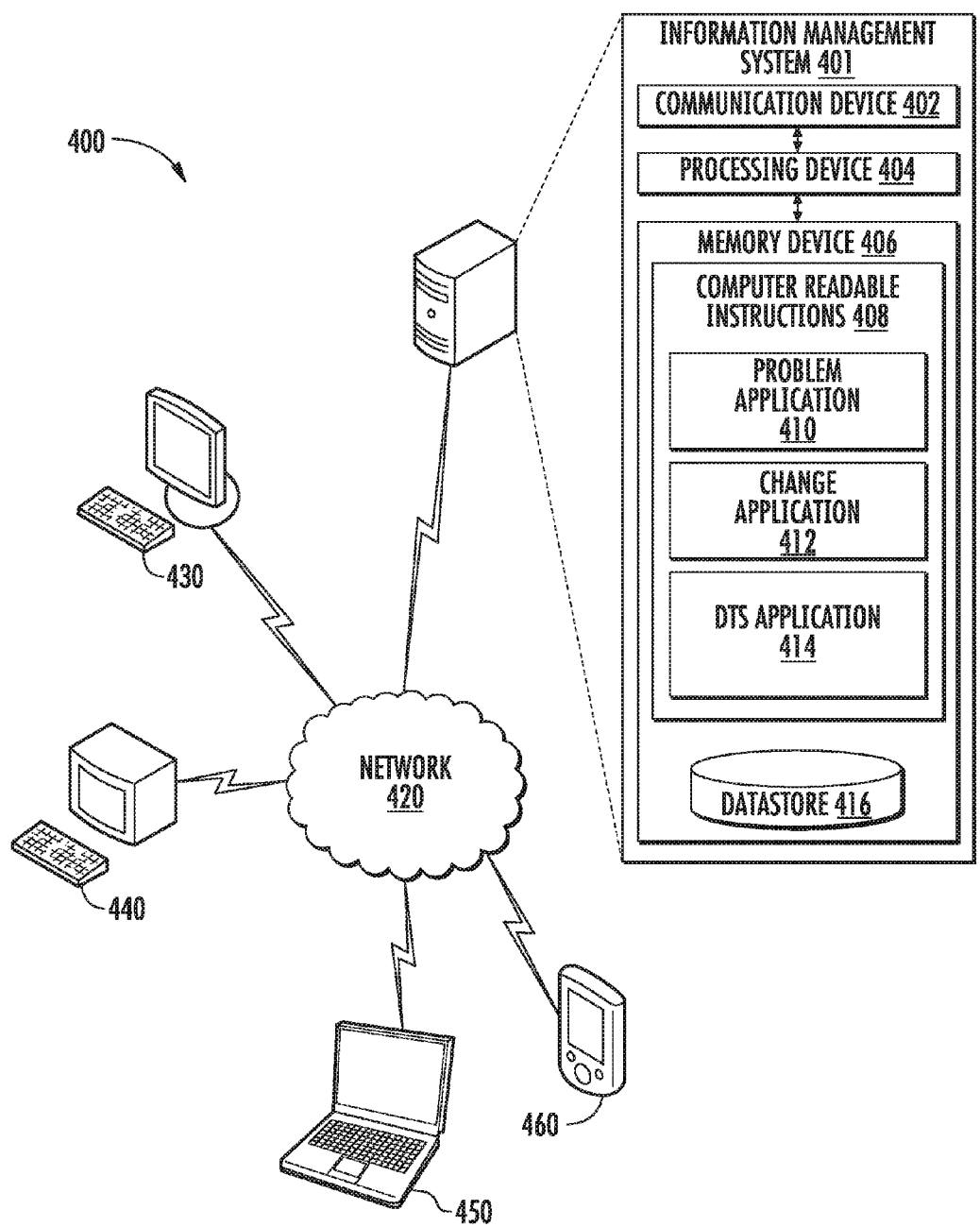

Having thus described embodiments of the invention in general terms, reference will now be made to the accompanying drawings, wherein:

FIGS. 1A and 1B are flowcharts illustrating methods for information management related to a problem definition initiative according to embodiments of the invention;

FIGS. 2A and 2B are flowcharts illustrating methods for information management related to a change deployment according to embodiments of the invention;

FIGS. 3A, 3B, and 3C are flowcharts illustrating methods for information management related to deployment of a plurality of changes according to embodiments of the invention;

FIG. 4 is a block diagram of an environment in which an information management system operates and communicates across a network according to embodiments of the invention;

FIGS. 5A, 5B, 5C, 5D, and 5E are illustrations of screenshots of a problem interface of an information management system according to embodiments of the invention;

FIGS. 6A, 6B, 6C, 6D, and 6E are illustrations of screenshots of a change interface of an information management system according to embodiments of the invention; and FIGS. 7A.1, 7A.2, 7B, 7C, 7D, 7E and 7F are illustrations of screenshots of a detailed task scheduler (DTS) interface of an information management system according to embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

According to embodiments of the invention, an information management system includes, in various embodiments, multiple components. For example, in some embodiments, the information management system includes a problem component, a change component and a detailed task scheduler (DTS) component. In some embodiments, each of the components is embodied in an application stored on or near the information management system, such as within computer-readable instructions stored in a memory device of the information management system as discussed further below. The various components are presented to users through a one or more interfaces corresponding to the components of the system and their applications. The user typically accesses the information management system remotely from a workstation across a network, such as an intranet or the Internet or a combination. Accordingly, the problem component of the system is presented to users as a problem interface as discussed below, the change component is presented to users as a change interface as discussed below, and the DTS component is presented to users as a DTS interface as discussed below. Each of the interfaces provides information regarding its subject matter and is also configured for receiving user input in a variety of ways.

The problem interface, in some embodiments, is configured for providing users access to information concerning a problem definition initiative, that is, during an effort to determine detailed information regarding a problem facing an organization and/or its lines of business. In some instances the term "problem" also refers to a business issue being considered for resolution, a stratagem being considered for implementation, infrastructure being considered for installation, one or more changes being considered for deployment, and/or the like. The change interface, in some embodiments, is configured for providing users access to information concerning a change either scheduled for deployment within the organization, during deployment or post-deployment. The DTS interface, in some embodiments, is configured for providing users access to information regarding a multiple change deployment or release. A change, for example, may refer to installation of a software application on the workstations within particular lines of business within an organization. A release refers to a project involving release of multiple changes. Such a release is typically performed across an entire organization or across large entities or groups of entities within an organization. Thus, the DTS interface allows users to access information regarding many different changes scheduled to take place, during the release itself, or after the release has occurred. In various embodiments of the problem interface, the change interface, and/or the DTS interface, summary or session information of a general nature can be provided to users, a dialogue or chatting function can be provided as well as listings of active and scheduled participants can be provided. The summary or session information can include, in various embodiments, information regarding one or more bridgeline conferences either scheduled or ongoing that are associated with the subject matter of the interface session(s), that is, associated with the particular problem under consideration, the particular change being deployed, and/or the particular release scheduled or underway. In this regard, the information management system provides its users a centralized repository of real-time, up-to-date information regarding the problem initiative, the change deployment and/or the release as well as the ability to interact with one another. In some embodiments, the interfaces provide users an opportunity to come up to speed on an issue before joining in a teleconference or other dialogue, thereby improving efficiency during the teleconference or dialogue.

Generally speaking, an initiative refers to an effort with regard to an issue being addressed, such as a problem, change deployment or multiple change deployment. A session may be or include, for example, a problem interface, a change interface, or a DTS interface being provided by the system as a tool used during the initiative. In some embodiments, a session may also include a dialogue such as a teleconference or chat, and in some such embodiments, the interface provided by the system facilitates such dialogue. For example, an administrator initiates a problem interface associated with a particular problem initiative and such a problem interface may be referred to as a problem definition initiative session. A session may begin before, during or after dialogue and/or teleconferencing regarding a particular issue or initiative and/ or may end before, during or after dialogue and/or teleconferencing regarding a particular issue or initiative. In some embodiments, a session may begin and/or end before, during or after definition of a problem is complete, deployment of a change is complete and/or deployment of multiple changes is complete.

According to embodiments of the invention, a system and method manage information relating to a problem definition initiative in order to communicate some or all the information users. The method includes providing an interface users at workstations accessible by one or more of the users, receiving information comprising a plurality of messages from users communicating via the workstations during a problem definition initiative session, initiating display of at least one of the plurality of messages to the users via the interface, logging event data related to a plurality of events associated with the problem definition initiative session, and initiating display of at least some of the event data to the users via the interface.

Referring now to FIG. 1A, a flowchart illustrates a method 100A for information management related to a problem definition initiative. A problem definition initiative refers to the effort within an organization to define a problem. More specifically, a problem definition initiative includes some or all the meetings, conferences, communication sessions, such as those carried out via the problem interface of the invention, and the like. The first step in the method 100A, as represented by block 110 is receiving information comprising a plurality of messages from a plurality of users communicating via a plurality of workstations during a problem definition initiative session. The plurality of messages, in some instances, comprise and/or are referred to as a dialogue, chat or chatting session. The messages, in various embodiments, include status messages, for example, regarding the users of the interface or messages generated by one or more of the users of the interface. For example, a user may post information regarding details regarding the problem so that the other users can review the information. The next step, as represented by block 120 is initiating an interface to one or more of the plurality of users including initiating display of at least one of a plurality of messages via the interface on a viewing device such as a computer monitor, personal digital assistance, other mobile device, or the like.

The interface, for example, in some embodiments, includes two or more panels, such as panels vertically dividing the user's display. In one example embodiment, a first panel is configured for displaying at least some of the event data on the left-hand side of the display, a second panel is configured for displaying at least one of the plurality of messages in the middle of the display, and a third panel is configured for displaying a list of users participating in the session on the right-hand side of the display.

The next step, as represented by block 130, is logging event data related to a plurality of events associated with the problem definition initiative session. In some embodiments, for example, the event data includes data corresponding to one or more messages received from one or more users and corresponding to a dialogue, such as a chat session. As another example, the event data may include data related to a log of the messages published via the interface and/or data related to the users participating in and/or the users absent from the session. The next step, as represented by block 140, is initiating display of at least some of the event data via the interface.

Referring now to FIG. 1B, a flowchart illustrates a method 100B including additional steps for information management related to a problem definition initiative. In various embodiments, none, some or all the steps discussed with reference to FIG. 1B are performed, and in various embodiments, the steps performed are performed in the order shown in FIG. 1B, and in some embodiments, are performed in different orders.

The first step, as represented by block 150, is archiving at least a portion of the logged event data. The archived data, in various embodiments, is configured for searching and is retrievable for review and further consideration by current/future users of the system. In some embodiments, some or all the data is archived locally to the information management system and in other embodiments, some or all the data is archived remotely to the information management system. For example, in some embodiments, some or all the data is archived at a database remote from the information management system, and in some such embodiments, the information management system has access to the database for future search and/or retrieval requests.

The next step shown, represented by block 155, is initiating communication of an alert comprising information corresponding to an event related to logged event data. For example, in various embodiments, initiating communication includes initiating a pager alert, initiating a text message alert, initiating an email alert, initiating social media status update or other message, or the like.

The next step shown, represented by block 160, is initiating preparation of a report based at least in part on at least a portion of the logged event data or at least one of the received messages.

The next step shown, represented by block 165, is initiating a second interface in response to a request from a user, the second interface configured for receiving a plurality of messages from one or more of the plurality of users.

The next step shown, represented by block 170, is retrieving archived data from a datastore or database in response to a request from a user participating in the session. The archived data corresponds, in some embodiments, to a previously conducted session. In other embodiments, the archived data corresponds to an ongoing, current session. The archived data, in various embodiments, includes data such as session data and/or event data previously logged or otherwise stored.

The next step shown, represented by block 175, is logging session data related to the session and initiating display of at least some of the session data via the interface. In various embodiments, the session data, for example, includes data corresponding to an identification of a problem being addressed by the session. In various other embodiments, the session data, for example, includes data regarding the status of the problem being addressed by the session. Such data may, in some embodiments, include one or more of data regarding whether the scope of the problem, that is, which lines of business it touches, the breadth of the problem, that is, how far into the infrastructure of each particular line of business the problem reaches, and/or whether the problem is prior, current and/or a future problem, among others.

The next step shown, represented by block 180, is initiating preparation of a report based at least in part on at least a portion of the data corresponding to an identification of a problem being addressed by the session. In various embodiments, the report may include information regarding a status of the problem being addressed by the session as discussed above. Further, in various embodiments, the report may include information regarding a status of one or more solutions or solution steps proposed to address the problem. The report prepared in step 160 and/or in step 180, in various embodiments, can take any form, can be in any number of media and can be sent to one or more users.

Referring now to FIG. 2A, a flowchart illustrates a method 200A for information management related to a change deployment. For example, a change deployment may include introducing a new software product to all workstations within a particular line of business of an enterprise. In another example, a change deployment may include providing users within an organization a new methodology for dealing with a common everyday problem such as a procedure for dealing with a printer having a jammed sheet. The first step of method 200A, as represented by block 210, is receiving information comprising a plurality of messages from a plurality of users communicating via a plurality of workstations during a change deployment session. The plurality of messages, in some instances, is referred to as a dialogue, a chat or chatting session, similar to the problem initiative method discussed above. In various other embodiments, however, the users may be communicating before and/or after a change deployment has occurred. In fact, in some embodiments, for example, the information management system maintains the dialogue and, in some embodiments, other functionality of the system, before, during and after a change deployment.

The next step, as represented by block 220, is initiating an interface to one or more of the plurality of users including, for example, initiating display of at least one of the plurality of messages via the interface. In another example embodiment, initiating the display includes initiating display of task data corresponding to at least one task necessary for completing the change deployment. In various embodiments, the interface includes one or more panels configured for providing the user an easy view into desired information regarding the change deployment. For example, in one embodiment, the interface includes a first panel configured for displaying at least some of the event data on the left-hand side of the display. Further, a second panel is configured for displaying at least one of the plurality of messages in the middle of the display. Finally, a third panel is configured for displaying a list of users participating in the session on the right-hand side of the display. In various embodiments, different configurations are initiated in order to provide the user with various pieces of desired information regarding the change deployment. For example, in some embodiments only a first panel and a second panel are displayed, the first panel being configured for displaying information regarding the change deployment in general, and the second panel being configured for providing information such as the dialogue.

The next step, as represented by block 230, is logging event data related to a plurality of events associated with the change deployment session. The event data, in various embodiments, includes task status data indicating the status of the at least one task necessary for completing the change deployment. In various embodiments, the event data, for example, corresponds to one or more messages received from one or more users.

The next step, as represented by block 240, is initiating display of at least some of the event data via the interface.

Referring now to FIG. 2B, a flowchart illustrates a method including additional steps for information management related to a change deployment. It should be noted that none, some or all the steps discussed with reference to FIG. 2B may be included in various embodiments of the invention, and in various embodiments, the steps performed are performed in the order shown in FIG. 2B, and in some embodiments, are performed in different orders. The first step shown, represented by block 250, is archiving at least a portion of the logged event data. The archived data, as discussed above, is archived in some embodiments remote to the system and in other embodiments proximal the system. In some embodiments, the archived data is archived such that it is searchable and retrievable by either current or future users of the system.

The next step shown, represented by block 255, is initiating communication of an alert comprising information corresponding to an event related to logged event data. That is, when an event occurs, such as reaching a milestone or completing a task essential to the change deployment, the system accepts input from a user regarding the event and logs data corresponding to the event, which is called event data. In other embodiments, one or more messages or other information is received by the system, and the system determines that an event has occurred. For example, in one embodiment, the system receives a message from a user in the dialogue indicating that a goal has been achieved. The system is configured to monitor the dialogue in order to determine whether any significant events are discussed. Based on a textual analysis of the messages, the system can determine whether an event has occurred, and if so, log data corresponding to the event. In some embodiments, the system determines that an event probably occurred and confirms that the event occurred with one or more users of the system. For example, in one embodiment, the system sends a user a private message requesting the user confirm that a particular event has occurred.

The next step shown, represented by block 260, is initiating preparation of a report based at least in part on at least a portion of the logged event data or at least one of the received messages.

The next step shown, represented by block 265, is initiating a second interface in response to a request from a user. The second interface is configured, in some embodiments, for receiving a plurality of messages from one or more of the plurality of users.

The next step shown, represented by block 270, is retrieving archived data from a database in response to a request from a user participating in the session. The archived data, in some embodiments, corresponds to a previously conducted session, and in other embodiments, corresponds to an ongoing, current session. The archived data, in various embodiments, includes data such as session data and/or event data previously logged or otherwise stored.

The next step, represented by block 275, is logging session data related to the session and initiating display of at least some of the session data via the interface. The session data, in various embodiments, for example, may include data corresponding to an overall status of the change deployment being addressed by the session. In various other embodiments, the session data may include change deployment identification information such as a name of the change deployment or a reference number for the change deployment or the like. In various embodiments, the session data may include change deployment summary information such as a brief prose description of the goals and/or tasks addressed by the change deployment.

The next step shown, represented by block 280, is initiating preparation of a report based at least in part on at least a portion of the data corresponding to task status data indicating the status of the at least one task necessary for completing the change deployment. The report prepared in step 260 and/or in step 280, in various embodiments, can take any form, can be in any number of media and can be sent to one or more users.

The next step shown, represented by block 285, is initiating display of a plurality of required participants and the status, that is, whether or not each of the plurality of participants are currently participating, have currently participated previously and/or have not participated. This display provides an element of accountability as well as information for those individuals participating in the session. First of all, it provides a user the opportunity to anticipate the participants necessary for the change deployment and the session as well as providing users the opportunity to view which individuals or lines of business are absent from the session who are scheduled to be present. In this regard, the user may then follow up with the individuals and/or lines of business or otherwise make note of the absence of the individuals and/or lines of business.

Referring now to FIG. 3A, a flowchart illustrates a method 300A for information management related to deployment of a plurality of changes. In various embodiments, the system performing various steps of the method 300A is referred to as a detailed task scheduler (DTS) system. The first step, as represented by block 310, is receiving information comprising initiative data corresponding to each of a plurality of changes. In some embodiments, the initiative data includes data relating to a plurality of parameters corresponding to each of the plurality of changes. The information received relates to a multiple change deployment session. In some embodiments, the information received also includes a plurality of messages from a plurality of users communicating via a plurality of workstations during a multiple change deployment session. In some embodiments, similar to methods 100A and 200A discussed above, the plurality of messages comprise a dialogue, also referred to as a chat or chatting session.

The next step, as represented by block 320, is initiating an interface to one or more of the plurality of users including, for example, initiating display of at least some of the initiative data. In some embodiments, as mentioned above, the initiative data may include one of the plurality of messages that are also displayed via the interface to the users. For example, in some embodiments, the display includes multiple panels configured for presenting various pieces of data to a user in a readily available format. In one embodiment, the first panel is configured for displaying at least some of the event data on the left-hand side of the display, a second panel is configured for displaying at least one of the plurality of messages in the middle of the display, and a third panel is configured for displaying a list of users participating in the session on the right-hand side of the display.

The next step, as represented by block 330, is logging event data related to a plurality of events associated with the multiple change deployment session. The event data, in some embodiments, includes change status data indicating the status of the at least one of the plurality of changes associated with the deployment. In some embodiments, each change is also related to task data that indicates the status of at least one of the tasks required in order for the change to be successful. The event data, in some embodiments, also corresponds to one or more messages received from one or more users. The next step, as represented by block 340, is initiating display of at least some of the event data via the interface.

Referring now to FIG. 3B, a flowchart illustrates a method 300B including additional possible steps for information management related to deployment of a plurality of changes. It should be noted that none, some or all the steps discussed with reference to FIG. 3B may be included in various embodiments of the invention, and in various embodiments, the steps performed are performed in the order shown in FIG. 3B, and in some embodiments, are performed in different orders. The first step shown, represented by block 350, is archiving at least a portion of the logged event data. The archived data, in various embodiments, is configured for searching and retrieval in response to a request from a user.

The next step shown, which is represented by block 355, is initiating communication of an alert comprising information corresponding to an event related to logged event data. For example, in some embodiments, initiating communication includes initiating a pager alert, initiating a text message alert, initiating an email alert, initiating social media status update or message or the like.

The next step shown, represented by block 360, is initiating preparation of a report based at least in part on at least a portion of the logged event data or at least one of the received messages.

The next step shown, represented by block 365, is initiating a second interface in response to a request from a user, the second interface configured for receiving a plurality of messages from one or more of the plurality of users in various embodiments.

The next step shown, represented by block 370, is retrieving archived data from a database in response to a request from a user participating in the session. In some embodiments, the archived data corresponds to a previously conducted session, and in other embodiments, the archived data corresponds to a current, ongoing session.

The next step shown, represented by block 375, is logging session data related to the session and initiating display of at least some of the session data via the interface. In some embodiments, for example, the session data includes data corresponding to an overall status of the multiple changes being deployed. For example, in one embodiment, the overall status indicated a percentage toward the goal of completion of all changes. In some embodiments, as another example, the session data includes multiple change deployment identification information. For example, in some such embodiments, the multiple change deployment identification information indicates the identity, such as a name or codename, by which a particular change is referenced. In another example, the multiple change deployment identification information includes information regarding the line of business or individuals associated with each particular change, such as the individual or individuals who initially identified the change as a valid response to a problem, for example. In another example, the sessions may include multiple change deployment summary information. The summary information, in various embodiments, may include information regarding each of the changes being deployed during the release. The summary information may include a short description of the change taking place, the tasks necessary for the change to be completed, and the outlook for the affected lines of business post change.

The next step shown, represented by block 380, is initiating preparation of a report based at least in part on at least a portion of the data corresponding to an overall status of the multiple changes being deployed, the multiple change deployment identification information, and/or the multiple change deployment summary information. The report prepared in step 360 and/or in step 380, in various embodiments, can take any form, can be in any number of media and can be sent to one or more users.

Referring not to FIG. 3C, a flowchart illustrates a method 300C including additional possible steps for information management related to deployment of a plurality of changes. It should be noted that, similar to FIG. 3B, none, some or all the steps discussed with reference to FIG. 3C may be included in various embodiments of the invention, and in various embodiments, the steps performed are performed in the order shown in FIG. 3C, and in some embodiments, are performed in different orders. The first step shown, represented by block 390, is initiating display of a plurality of required participants. Also, in various embodiments, the status of each of the plurality of required participants is displayed. The interface, in some embodiments, as discussed above, includes multiple panels for separating and providing information in an easily-accessible format. In some embodiments according to FIG. 3C, the interface includes a first panel and a second panel. The first panel is configured for displaying at least one of the plurality of messages and the second panel is configured for displaying the plurality of required participants and the status, in some embodiments, of each of the plurality of required participants. In various embodiments, at least one of the plurality of required participants includes a line of business or one or more individuals. Also, in various embodiments, the status is selected from a previously active status, a currently active status or a never active status.

The next step shown, represented by block 395, is receiving a plurality of change initiative plans, each of the change initiative plans comprising the initiative data corresponding to a plurality of changes.

In one application, for example, numerous users associated with different lines of business across an organization are scheduled to be involved in an enterprise-wide release or multiple change project. Each of the users uploads parameters relating to one or more changes scheduled to occur during the release. The system receives those parameters and an interface is provided to the users that allows access to information concerning some or all the scheduled changes before, during and/or after the scheduled release of the changes. The interface, in some embodiments, includes dialogue functionality and in some embodiments includes various panels and/or windows/pages for providing information concerning one or more of the changes.

Referring now to FIG. 4, an environment 400 in which an information management system 401 operates is illustrated. The information management system 400 may, in various embodiments be configured for performing one or more of the methods 100, 200, and/or 300 including or excluding one or more of the various steps disclosed above. In the configuration shown, the information management system 401 communicates across a network 420 with one or more remote devices, such as workstation 440, workstation 430, laptop 450 and/or handheld device 460. This configuration is intended to illustrate that a user (not shown) can interact with the information management system 401 using a variety of remote devices. Furthermore, in some embodiments one or more users can interact with the information management system 401 locally such as through an input/output device attached directly with the information management system 401.

The information management system 401, in various embodiments, has a communication device 402 controlled by a processing device 404 in order to communicate across the network 420. The network 420 is an intranet, the Internet, a local area network, a wide area network, and/or any other electronic device network, and/or any combination of the same. The processing device 404 is also in communication with a memory device 406 configured for storing computer-readable instructions 408. The computer-readable instructions, in various embodiments, include one or more of a problem application 410, a change application 412, and/or a detailed task scheduler (DTS) application 414. In some embodiments, each of these applications are contained within one application, and in other embodiments, two of the application are contained within one application. In various embodiments, one or more of the applications are stored remotely from the information management system 401 and accessed as necessary by the system 401 and/or any other device requiring instructions. Further, in some embodiments, the memory device 406 includes a datastore 416 configured for storing information and/or data such as the archived data discussed above. In other embodiments, the datastore 416 is housed remotely and the information management system 401 is in communication with the datastore 416.

Generally, in some embodiments, the method steps and/or sub-steps discussed above with reference to FIG. 1A and FIG. 1B are embodied in computer-executable instructions within the problem application 410. In some embodiments, the method steps and/or sub-steps discussed above with reference to FIG. 2A and FIG. 2B are embodied in computer-executable instructions within the change application 412. Finally, in some embodiments, the method steps and/or sub-steps discussed above with reference to FIG. 3A, FIG. 3B, and FIG. 3C are embodied in computer-executable instructions within the DTS application.

Referring now to FIGS. 5A-5E, several screenshots of the information management system problem interface 500 are illustrated. The problem interface 500 is also referred to herein and/or in the configuration shown as a problem portal, an incident portal and/or an incident interface. The configurations shown in FIGS. 5A-5E are one implementation embodiment of one or more of the method steps and/or sub-steps discussed with reference to FIGS. 1A and/or 1B, and/or other steps and/or functions.

Figure 5A:
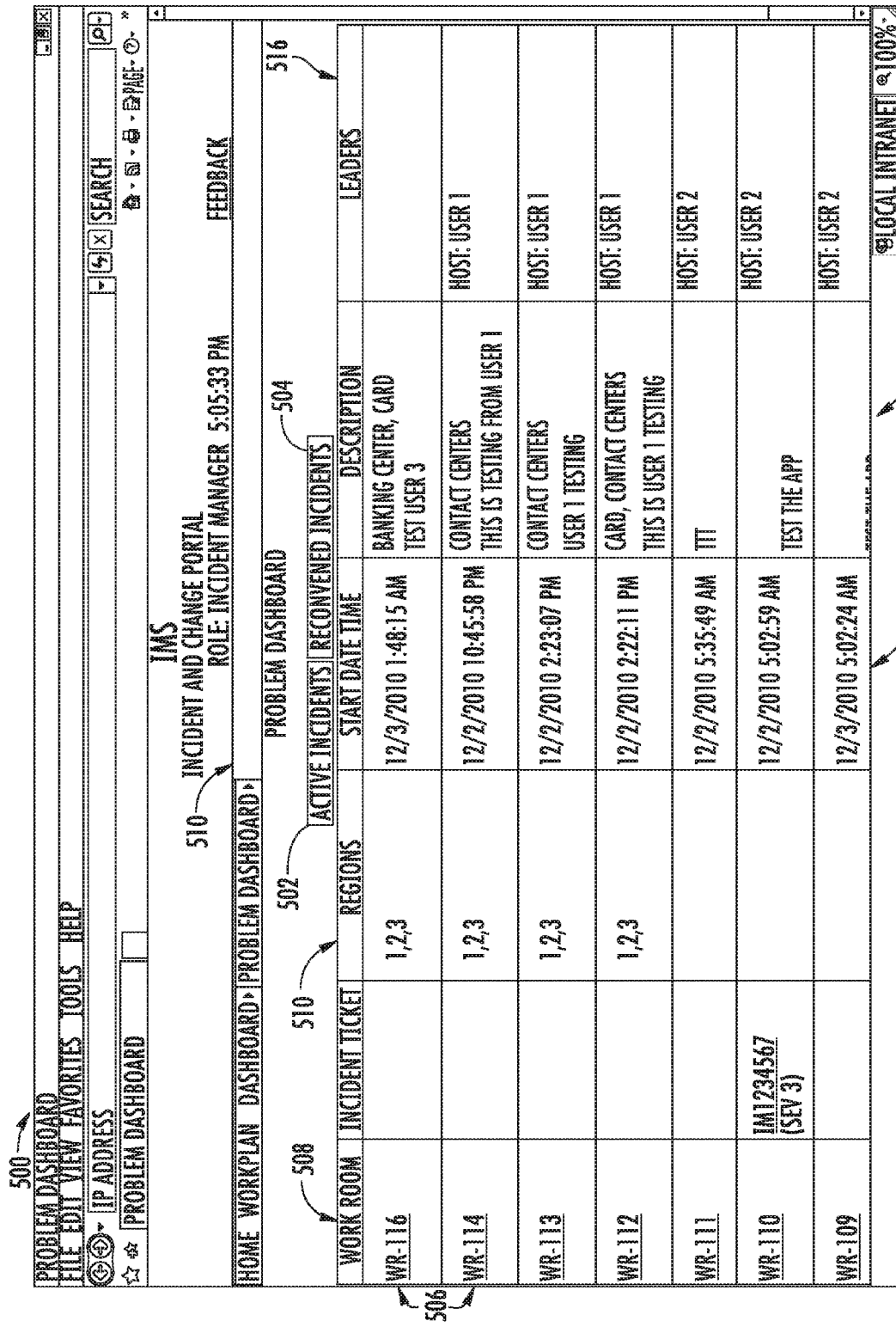

Referring now to FIG. 5A, a problem dashboard 501 of the problem interface 500 is shown according to embodiments of the invention. In the embodiment shown, the problem dashboard 501 is configured for providing a listing of workrooms 506, each associated with a problem, incident or other matter being considered. The problem dashboard 501 includes an active incidents tab 502 and a reconvened incidents tab 504. The active incidents tab 502 directs the user to a listing of active incidents or problems. In other words, the listing shown in FIG. 5A is a listing of ongoing, current problem workrooms 506. The problem dashboard 501 includes a variety of information regarding each of the workrooms 506 listed. For example, in the embodiment shown, the problem dashboard 501 a workroom identification number 508, the geographic region 510 to which the problem pertains, the start date/time 512 of the problem workroom 506, a brief description 514 of the problem and the host or leader 516 of the problem workroom 506. The reconvened incidents tab 504 directs the user to a listing of problem workrooms 506 that are not ongoing/current. For example, a problem workroom 506 associated with a problem that has been sufficiently defined may be included in the reconvened incidents listing. Additionally, various other types of information may be included in the dashboard 501 in various embodiments.

Figure 5B:
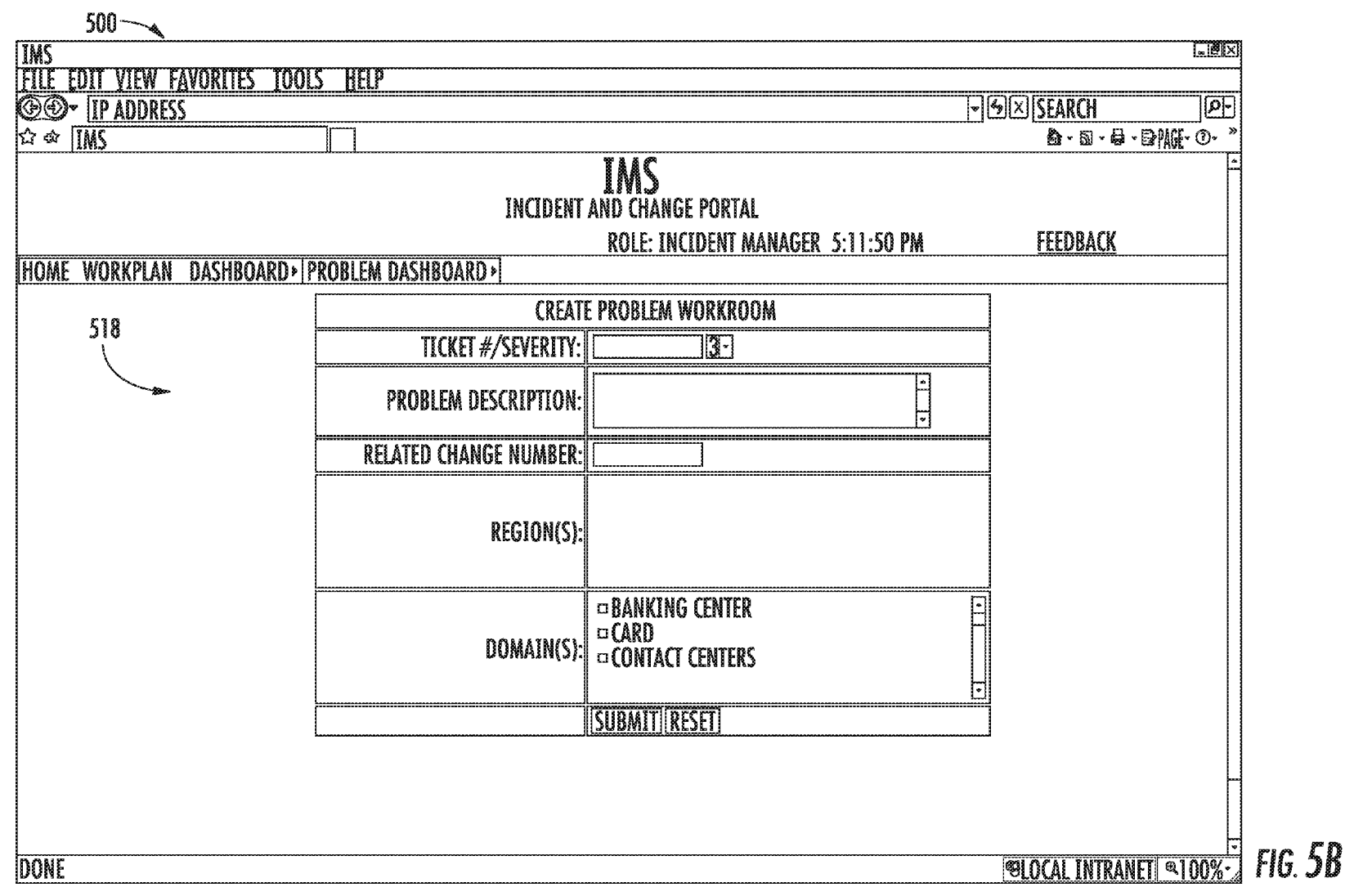

Referring now to FIG. 5B, a create workroom page 518 of the problem interface 500 is shown. The create workroom page 518 is configured for receiving user input regarding creating a workroom corresponding to a problem and, in some embodiments, to define parameters related to the problem. In the configuration shown, the user can input a severity score, a problem description, a related change number, the geographic region of the organization's business to which the problem applies, and a domain for the problem. The related change number is a number referring to one or more changes associated or corresponding to the problem. In other embodiments, additional or less information regarding the problem may be inputted. The domain, as shown, refers to the type of problem, such as, for example, a problem regarding a banking center or a problem regarding a bank card.

Figure 5C:
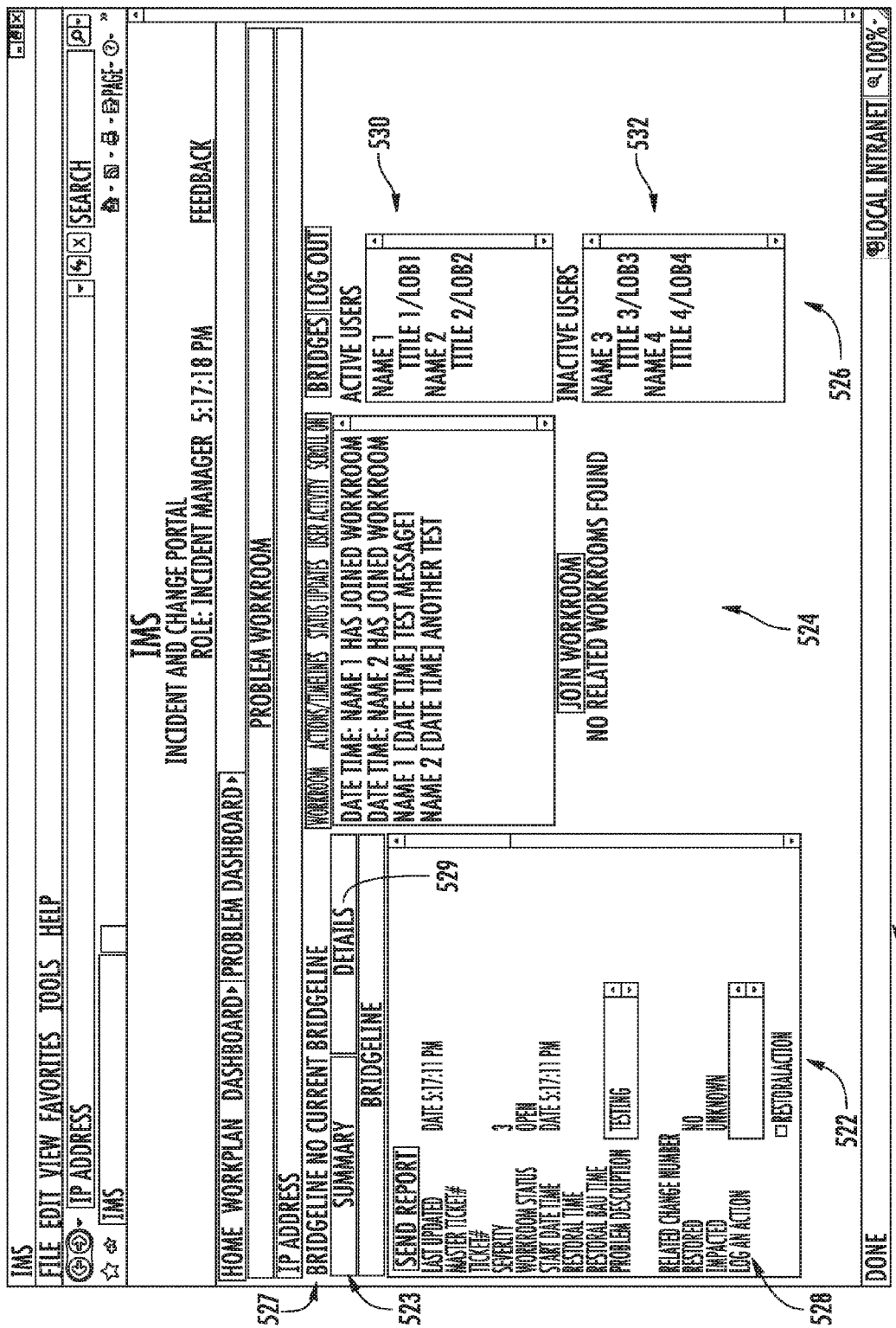

Referring now to FIG. 5C, a problem workroom 520 of the problem interface 500 is shown. The problem workroom 520, as shown, is divided into three panels: a left-hand panel 522, a middle panel 524, and a right-hand panel 526. In various embodiments, the panels 522, 524, and/or 526 are configured to include the type(s) of information most germane to the issues encountered by the particular organization and/or one or more of its lines of business. In the embodiment shown, the left-hand panel 522 is configured for displaying summary information 523 regarding the incident such as identification information, severity information, workroom status information, start date/time information, problem/incident summary and/or description information and other information. In various other embodiments, more or less information may be displayed in the left-hand panel 522 depending on the specific configuration used and the specific problem workroom 520. The left-hand panel 522 also includes information concerning one or more bridgelines associated with the problem workroom 520, in some embodiments, so that those users desiring to enter a discussion regarding the problem can do so easily. In various embodiments, information regarding other types of communication portal such as information regarding a chat room in addition to the interface or multiple conference bridgelines is provided via the interface. In some instances, the problem workroom 524 remains active concurrently with a bridgeline conference and, in fact, can remain active indefinitely. In some instances, multiple bridgeline conferences may be conducted using the same incident workroom. Such a pattern may continue until the problem is sufficiently defined and/or a sufficient change has been implemented or until one or more individuals determines the problem workroom 520 may be closed and/or moved into the reconvened problem listing.

In some embodiments, in addition to the summary information 523, the left-hand panel also includes a detail window 529 including one or more fields for receiving user input. For example, in one embodiment, the detail window 529 is configured for receiving user input regarding some or all the summary information, such that, once a user has input information into the detail window 529, that information is displayed as summary information 523. The detail window 529 includes various fields for receiving user input, such as fields configured for receiving user input regarding choosing a restoral action as well as fields for inputting customer impact, agent impact, work around, restoral summary, next steps/follow up, root cause, and choosing the geographic regions in which the problems have been restored. A restoral action and/or restoral summary refer to actions, tasks, changes, and/or the like that are or were implemented in related to a problem in order to remedy the problem or otherwise address the problem. In some embodiments, fields are provided for receiving user input regarding which impacted sites have been restored, which impacted applications are restored, which impacted domains are restored, and/or which impacted lines of business are restored. Impacted sites are the physical business locations that were or are impacted by the problem. In some embodiments, the summary information 523 and/or the detail window 529 also includes information related to managers associated with the problem workroom 506, such as a triage manager, an incident manager and the like.

In addition to receiving and displaying various types of summary information 523, the left-hand panel 522, in the embodiment shown, also includes an input field 528 for receiving user input regarding logging an action or an event. In the embodiment shown, the detail window 529 provides a field for receiving user input regarding logging an action or event. In this embodiment, a user can input an event for the system to log, and potentially archive. Once the system receives the event information from the user, it is generally referred to as event data. Event data relates to, for example, in some embodiments, data corresponding to one or more events such as data being input by a user to the interface, one or more users joining the interface and/or exiting the interface, one or more happenings within the organization recognized by one or more automated systems. For example, in some embodiments, organization systems track particular happenings with regard to workstation health, such as the number of viruses detected on a particular class of machines. In some embodiments, if the number of viruses detected and/or cleaning from a particular class of machines exceeds a predetermined threshold, then the system automatically logs that information and the interface logs that information as event data.

The event data is logged by the system, and as discussed below, in some embodiments, some or all the event data is also displayed and/or archived. Logging the event data refers to either temporarily storing the data and providing access to the data locally, that is either on the user's machine and/or on the machine(s) implementing and/or initiating the interface, such as the information management system, by way of the problem interface 501 or semi-permanently or permanently storing the data locally, and in some embodiments, associating the data with a specific problem workroom 506. On the other hand, archiving the data, in some embodiments, generally refers to a relatively more permanent storage of the data such that a future user could, using the information management system, search and retrieve desired archived data from a datastore remote to the information management system and/or the user's workstation. In various other embodiments, in addition to receiving event data generated from a user, the system can determine whether an event should be logged automatically, such as by analyzing a message posted by a user. For example, in one embodiment, a user posts a message indicating that a particular action item has been completed, and the system analyzes the message and either flags the message for administrator review or automatically interprets the message, if possible, to determine event data, thereafter logging the event data.

In some embodiments, such as the embodiment shown in FIG. 5C, the problem workroom 520 includes a middle panel 524 configured for listing a plurality of messages. Messages can either be generated automatically by the system or are received by the problem interface 501 from one or more users. For example, when a user, NAME1, joined the workroom, the system generated and published a message indicating the user has joined the workroom. Such a message, in some configurations, would be automatically classified as a user activity, for example. As another example, the user NAME1 input a message "Test message 1" that was also published in the middle panel 524. Such a message would automatically be classified as user activity as well. Furthermore, in some embodiments, the middle panel provides a user the opportunity to filter and/or sort the plurality of messages based on whether the messages correspond to action/timeline information, status updates, user activity and the like. In some embodiments, the user can input information regarding one or more of these fields. For example, in one embodiment, a user can input a message regarding the timeline for achieving an action item with regard to the project. Such a message would automatically be classified as a "timeline" message. Hence, when a user sorted the plurality of messages using the timeline button, such a message would be retrieved. In this regard, such information may constitute event information/data, and the system processes such data accordingly, that is, by either confirming its nature as event data and/or automatically logging it as event data.

In the embodiment shown, a right-hand column 526 is configured for providing an active user listing 530 as well as an inactive user listing 532. Thus, the right-hand panel 524 provides users information regarding those users currently active in the workroom 506 as well as information regarding those users not currently active in the workroom 506 but whose activity is expected. Such information can be useful at least in determining how to proceed with regard to conference scheduling, discussions and the like.

Figure 5D:
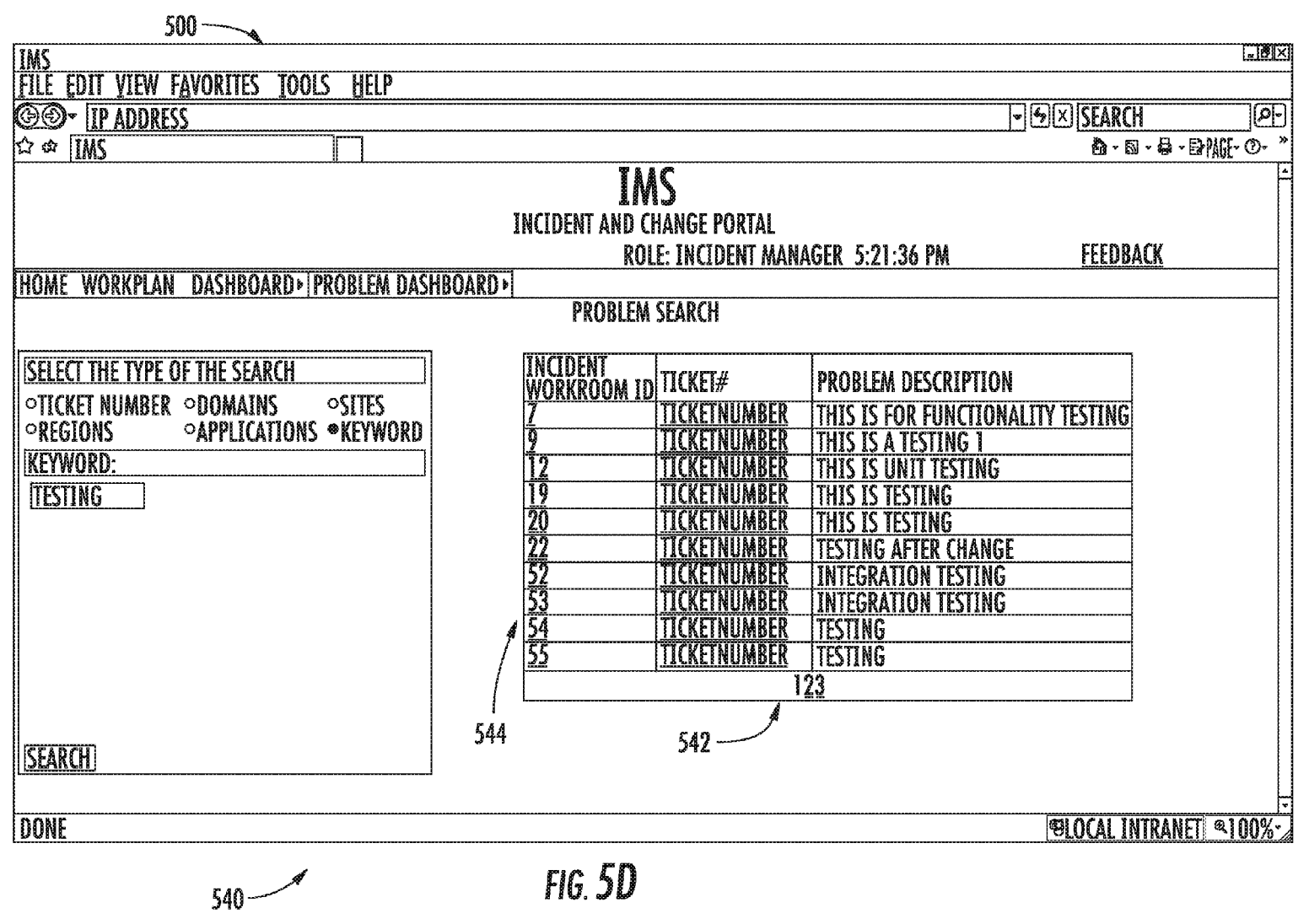

Referring now to FIG. 5D, a problem search page 540 of the problem interface 500 is shown. On the left-hand side of the page, a user's input is received regarding the type of search to perform. In the embodiment shown, several types of searches may be specified including a ticket number search, a domain search, a site search, a region search, an application search, or a keyword search. In various other embodiments, more or fewer search options are included, such as options to search individuals associated with a problem, severity of the problem, start date/time of the problem and the like. As discussed above, the domains associated with each particular problem indicate the field or area within the organization that the problem affects. For example, where the organization is a financial institution, the list of domains may include payments, deposits, bank card, ATM, and the like. The sites generally refer to a city or town, whereas region generally refers to a greater geographic area such as a state, country or even a continental or super-continental area. Applications generally refer to a particular application in official use by an organization and some or all its lines of business and/or individual associates. Shown in FIG. 5D are the search results 542 from a search performed for the keyword "testing". On the left-hand side of the search results, each result is identified by a problem workroom identification number 544.

Figure 5E:
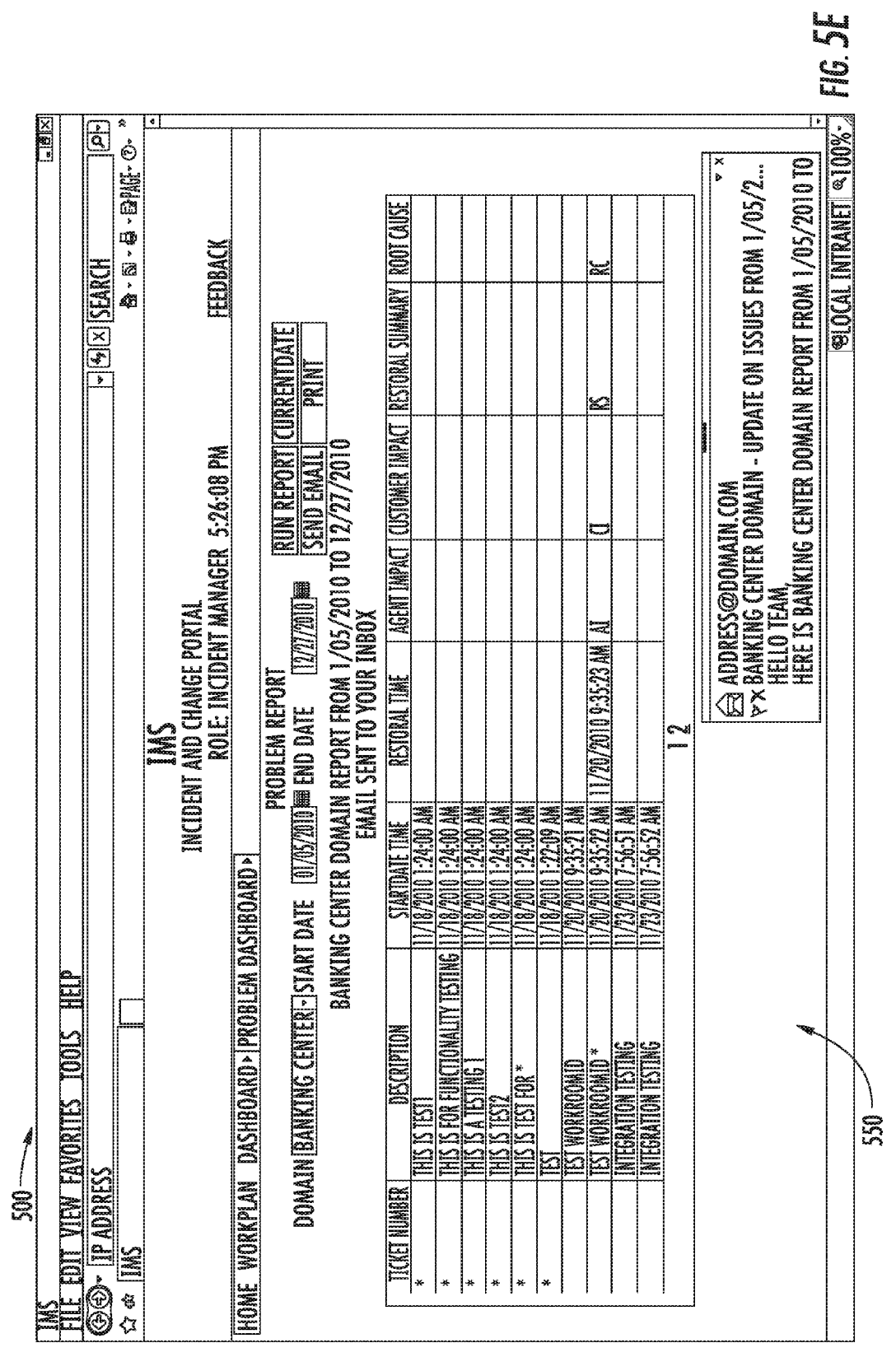

Referring now to FIG. 5E, a problem report page 550 of the problem interface 500 configured to facilitate preparing a report according to a user's request is shown. In the example shown, the report has been prepared by receiving user input requesting the "Banking Center" domain and specifying start dates. In various embodiments, reports may be generated based on a variety of data related to the various problems 506. For example, in some embodiments, reports can be generated based on severity of problems and region. In another example, reports can be generated based on problem workroom status, that is, whether or not an active workroom is associated with the problem. Furthermore, in some embodiments, the generated reports may be communicated using a variety of methods. For example, in various embodiments, generated reports are communicated to desired individuals and/or lines of business or groups of individuals using email, text message, social media update/message, or the like. In the embodiment shown, the report has been sent via email as evidenced by the notification in the lower right-hand corner of the screenshot.

Referring now to FIGS. 6A-6E, several screenshots of the information management system change interface 600 are illustrated. The change interface 600 is also referred to herein and/or in the configuration shown as a workplan interface, a workplan portal, and/or a change portal. The configurations shown in to FIGS. 6A-6E are one implementation embodiment of one or more of the method steps and/or sub-steps discussed with reference to FIGS. 2A and/or 2B, and/or other steps and/or functions.

Figure 6A:
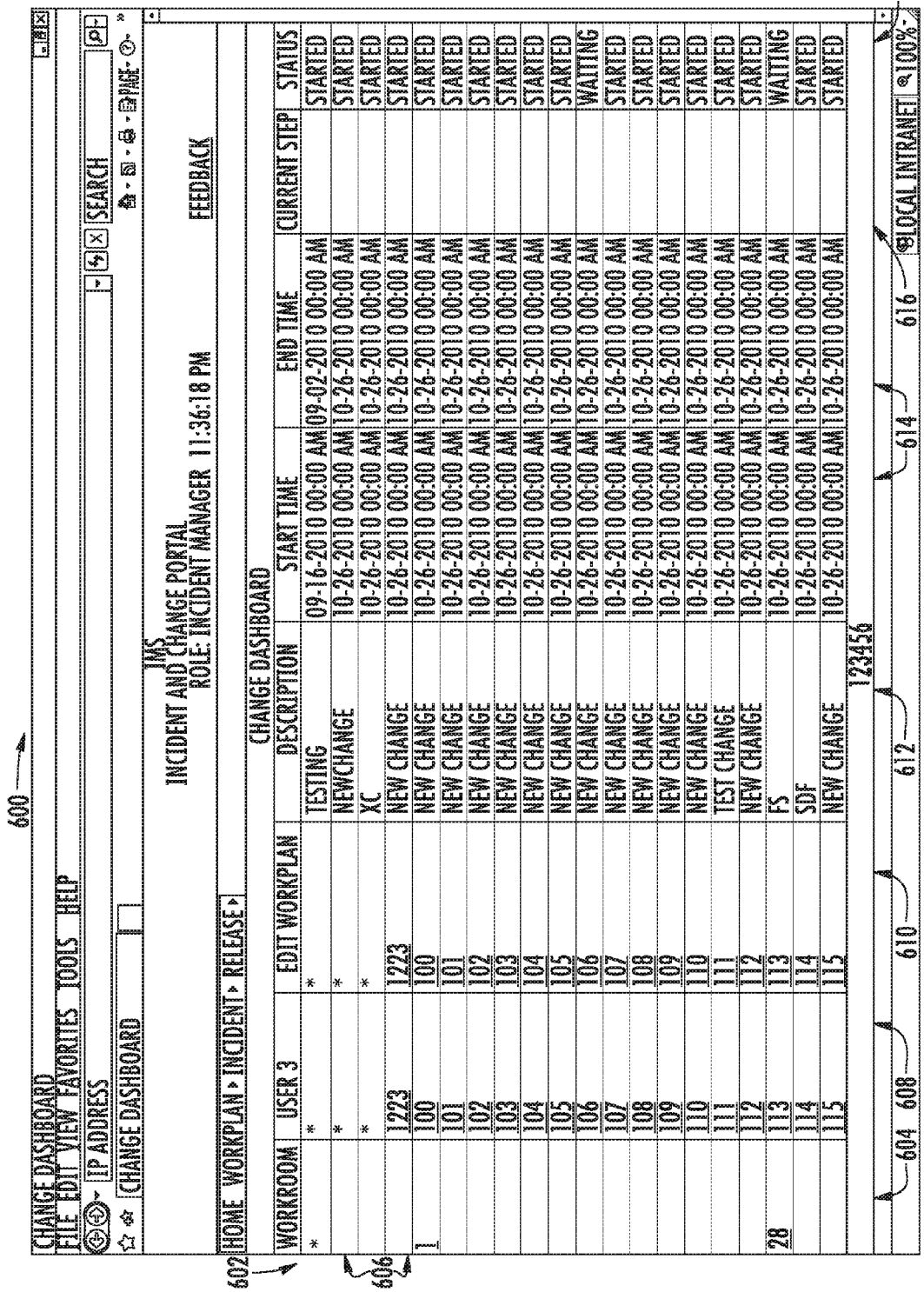

Referring now to FIG. 6A, a change dashboard 601 of the change interface 600 is shown according to embodiments of the invention. The change dashboard 601, in this embodiment, includes a listing 602 of changes 606, wherein each change 606 in the list includes a workroom identification link 604, asset management link 608, edit workplan link 610, description 612, time information 614, current step information 616, and current step status information 618. Choosing the workroom identification link 604 takes the user to the specific workroom associated with the change. Choosing the asset management link 608 takes the user to the asset plan drafted in conjunction with a change workplan in order to manage the assets necessary for implementing the particular change. Choosing the edit workplan link 610 takes the user to the workplan associated with a particular change. The description field provides the owner and/or administrator of each change to provide a brief description of the change. The start time and the end time provides the owner and/or administrator the opportunity to indicate the start time of the change and the end time of the change. For example, if the change includes installing a new version of an application across the organization's workstations, the start time may indicate the start time of the implementation of the installation of the new version of the software. Likewise, the end time may indicate the desired end time of the installation of the new version of the application. In another example, the start time and the end time indicate the start time and the end time of a workroom and/or a bridgeline conference regarding the change. The current step information, in various embodiments, includes information regarding the current workplan step. That is, each change workplan includes one or more tasks and/or milestones associated with achieving completion of the change. For example, in a change initiative associated with installed a new version of an application, installation of the new version of the application throughout all the workstations within a particular geographic area may constitute a task and/or a milestone. Current step information may also indicate more generally the step of the change initiative, such as, for example, a gathering information step, a planning step, a close to initiation of change step, an initiation of change step, a completion of change step, and/or a post-change step. In various other embodiments one or more of the preceding may or may not be included in the various steps used in the current step information of the change dashboard. This listing is provided merely as an example implementation.

Figure 6B:
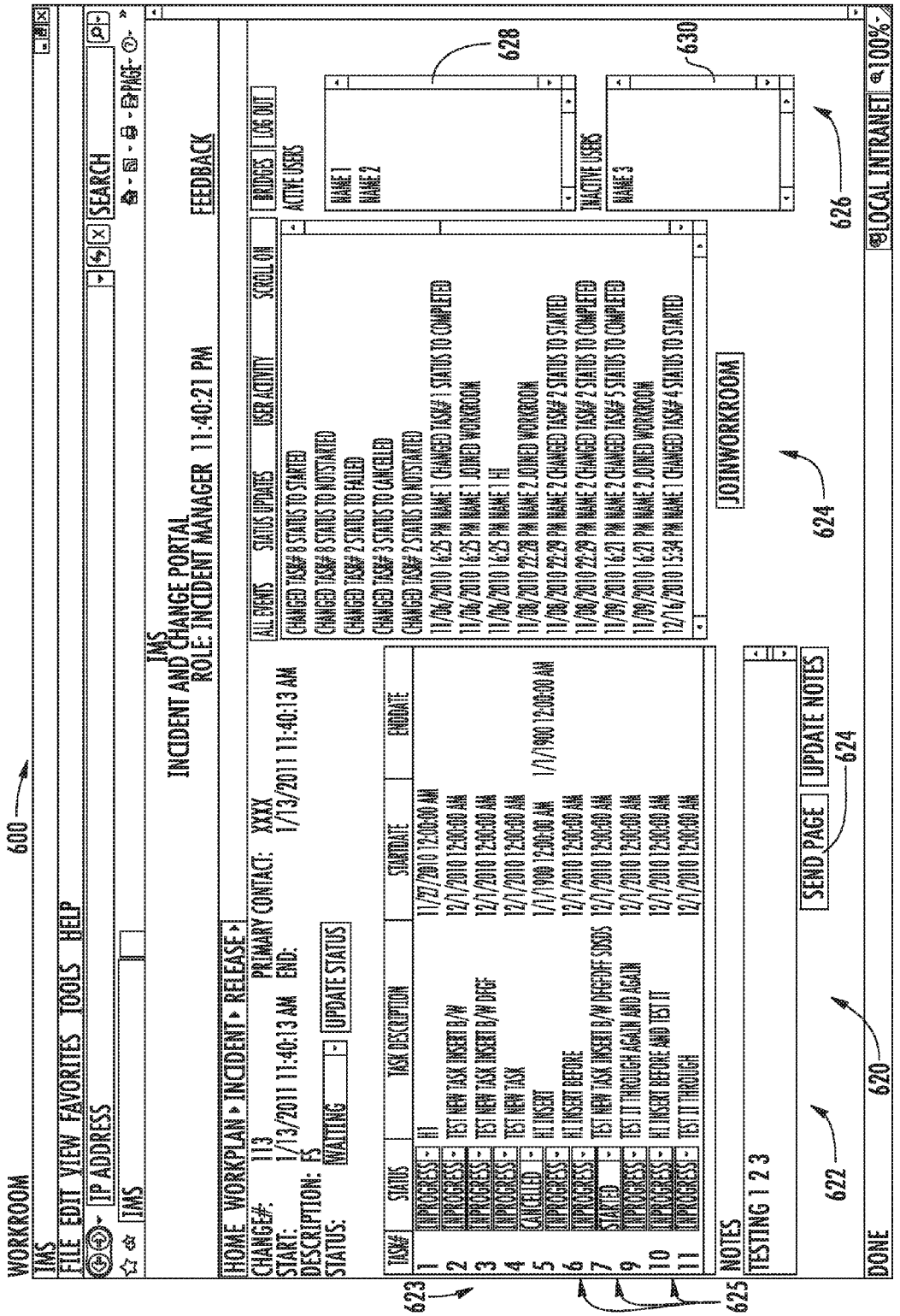

Referring now to FIG. 6B, a change workroom 620 of the change interface 600 is shown. The change workroom 620, similar to the problem workroom 520 discussed above, includes multiple panels, each for displaying information to users. A left-hand panel 622 is configured to display information associated with the change 606. Various fields provide summary information such as the change identification number, the primary contact name or nickname, the start time and end time of the change implementation, a description of the change, the current status of the change, and/or a listing 623 of tasks 625 associated with completion of the change. In various other embodiments, some or all the summary information shown in FIG. 6B is included and/or other information regarding a particular change may be included as well. In this embodiment, the left-hand panel 622 also includes a field configured for receiving user input in the form of notes as well as a send page button 624 configured to send a copy of the change workroom or a portion of the change workroom to a recipient via email, text message, social media update/message or the like.

The listing 623 of tasks 625 includes a drop-down input field configured for receiving user input regarding the status of a particular task, such as, for example, whether the task is in progress, cancelled, started, completed or the like. The listing 623 also includes a field for displaying a description of the task, as well as the start date/time and the end date/time of each individual task 625 associated with the change 606 associated with the workroom 620.

The middle panel 624 is configured for displaying a plurality of messages received from the users as well as other notifications such as changes to the task listing 623, notifications regarding active versus inactive users, and the like. As shown in the screenshot of FIG. 6B, the plurality of messages includes messages indicating updates regarding the status of various tasks included in the task listing 623. As with the middle panel 524 of the problem workroom 520, the middle panel 624 of the change workroom 620 is configured for allowing the user to filter and/or sort the plurality of messages based on whether the messages were status updates, user activity or the like. Of course, the user can also specify to view all the messages. The right-hand panel 626, similar to the right-hand panel 526 of the problem workroom 520, includes an active user listing 628 and an inactive user listing 630.

Referring now to FIG. 6C, a workplan creator page 640 of the change interface 600 is shown. The workplan creator page 640 includes various fields configured for receiving information from a change creator, or owner or administrator, with regard to the new change 606. For example, in the embodiment shown, the workplan creator page 640 includes fields for receiving user input regarding a change identification number, a description of the new change, a primary contact, an escalation contact, expected start and end times, actual start and end times, and/or predicted impacts. In various other embodiments some or all these fields may be provided or removed as well as the addition of other fields requesting additional information regarding the change being created. Additionally, formatted schedules or other externally prepared documents and/or files may be uploaded and associated with the change 606. Similar to the workplan creator page 640, the change interface 600 is configured for providing a workplan overview page configured for displaying the information previously input by a workplan creator.

Figure 6D:
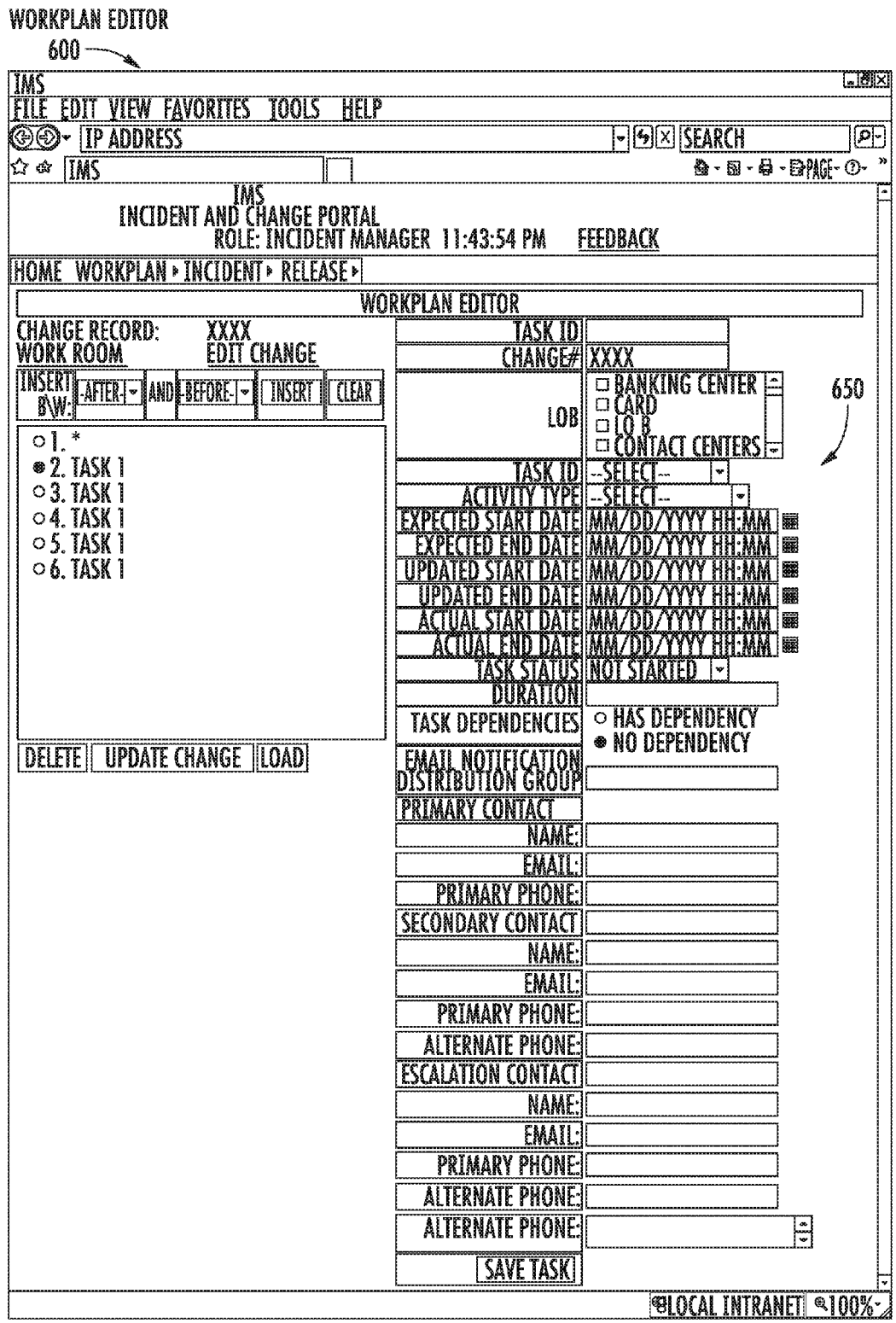
Figure 6E:
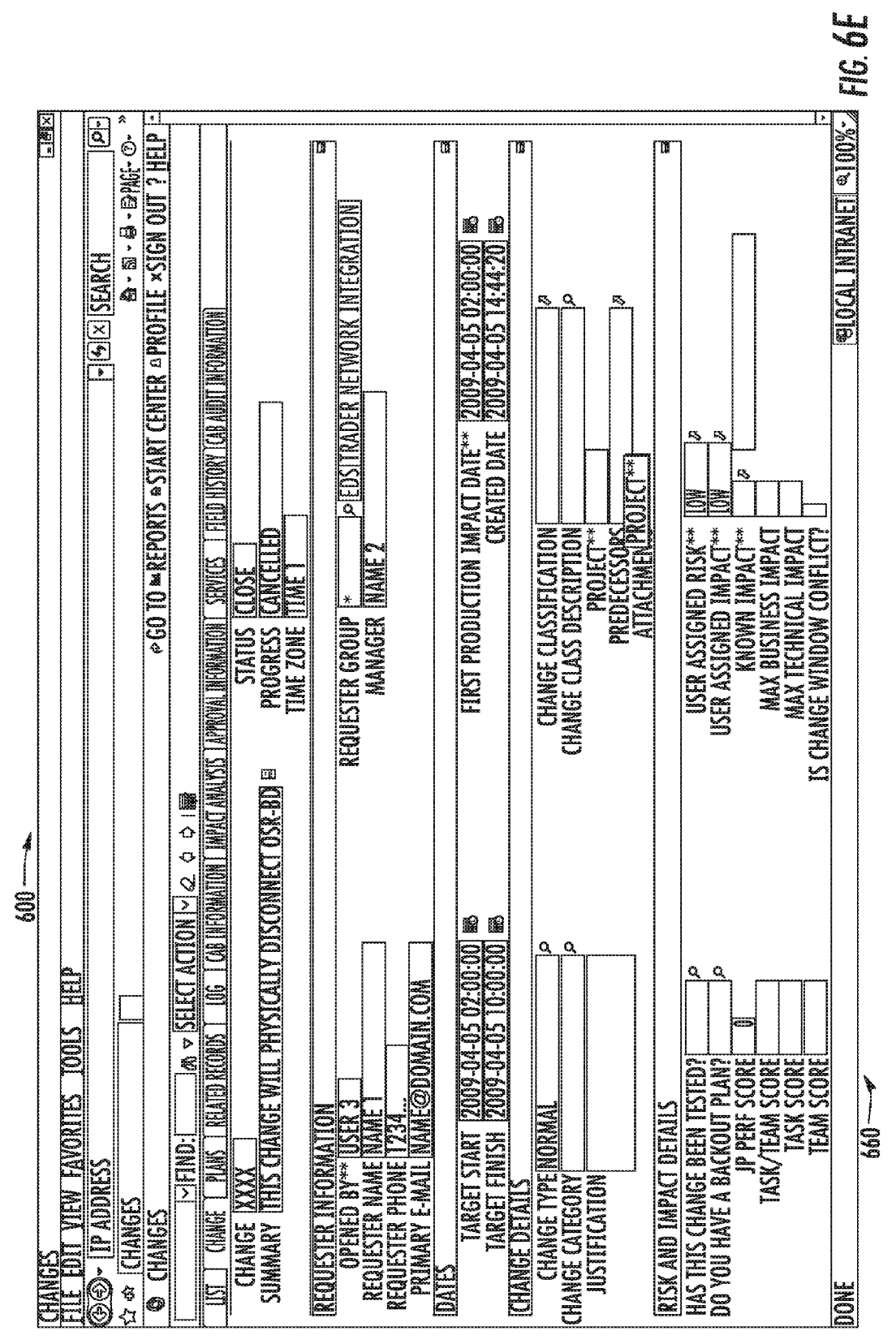

Referring to FIG. 6D, a workplan editor page 650 configured to facilitate a user editing particular information relating to the change is shown. The workplan editor page 650 includes a variety of fields configured for receiving user input regarding a workplan associated with a change. From the workplan editor page 650, a user may navigate to the workplan itself or may modify the listing of tasks, such as by changing the order in which the tasks are listed. The user may also select lines of business (LOBs) for which each particular task applies, among other pieces of information related to the tasks.

Referring now to FIGS. 7A-7F, several screenshots of the information management system DTS interface 700 are illustrated. The DTS interface 700 is also referred to herein and/or in the configuration shown as a DTS portal, a release interface, and/or a release portal. The configurations shown in FIGS. 7A-7F are one implementation embodiment of one or more of the method steps and/or sub-steps discussed with reference to FIGS. 3A, 3B, and/or 3C, and/or other steps and/or functions.

Referring now to FIGS. 7A.1 and 7A.2 concurrently, a DTS summary page 701 of the DTS interface 700 is shown according to embodiments of the invention. The DTS summary page includes numerous pieces of information associated with multiple changes 606. The DTS interface 700 provides users a high level picture of, in some embodiments, an organization-wide release. An organization-wide release, in other words, is a short period of time, such as a weekend, wherein an organization plans and schedules many different changes to take place. The DTS interface 700 provides a centralized repository and real-time tracking for information related to the multiple changes, before, during and after the release.

Referring back to FIGS. 7A.1 and 7A.2 concurrently, the DTS summary page 701 shown includes a change listing 702 including various pieces of information regarding each of the changes 606 in the listing 702. First, a workplan link 704 is displayed and configured for navigating a user to the workplan associated with a specific change 606. Other pieces of information regarding each of the changes 606 are change identification numbers 706, descriptions 708, change status 710, communication comments 711, total tasks 712A, total tasks outstanding 712B, total milestones 714A, total milestones outstanding 714B, expected start data/time 716, actual start date/time 718, expected end data/time 720, and actual end date/time 722. In various other embodiments, more or less information regarding each of the changes 606 is displayed. As shown under the "DTS Summary" page header, a filtering mechanism 724 is configured for receiving user input in order to filter the changes included in the listing 702. For example, in the embodiment shown, the filtering mechanism 724 receives user input regarding start dates and times as well as information regarding tasks in order to filter the changes included in the listing 702.

By choosing the communication comments 711 of a particular change 606, in some embodiments, the user is navigated to a page or a pop-up configured for receiving user input in the form of a comment. In some embodiments, the actual end data/time 722 field and/or the status 710 field provides a link configured for navigating a user to an overdue contact detail page and/or pop-up configured for providing contact information to the user as well as, in some embodiments, providing the user the opportunity to send a communication, such as an email, to one or more of the contacts associated with an overdue task and/or change. Some information provided by the overdue contact page and/or pop-up may include identification and/or contact information for a primary contact, secondary contact, escalation contact, and/or the like. The status 710 field, in various embodiments includes entries such as "Failed", "Not Started", "Cancelled" and the like. Some such entries, when the changes are overdue based on the expected end date/time 720 include links to the overdue contact detail page and/or pop-up. Furthermore, in some embodiments, such as the embodiment shown, an export button 726 is configured for providing an export functionality to a user. For example, in one embodiment, choosing the export button 726 navigates the user to an export preferences page (not shown) providing the user an opportunity to choose export preferences, such as the format of the exported data and/or report. In other embodiments, choosing the export button 726 automatically creates an export report based on predetermined or locked preferences. For example, in the embodiment shown, choosing the export button 726 automatically calls a spreadsheet program and populates a spreadsheet with data exported from the DTS summary page 701.

Figure 7B:
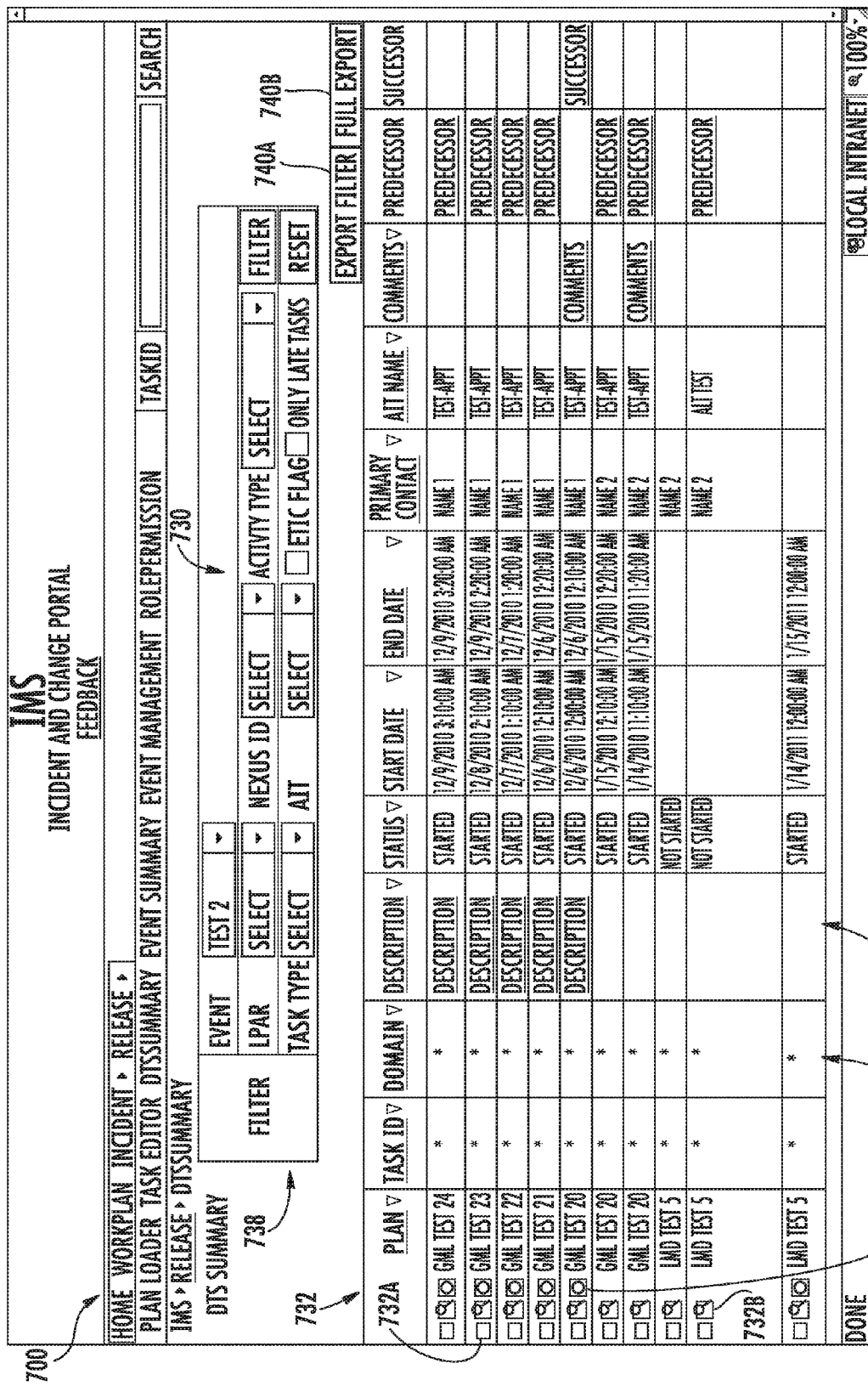

Referring now to FIG. 7B, another embodiment of a DTS summary page 730 is shown. As illustrated, the layout of this embodiment of the DTS summary page 730 is somewhat different from the layout the DTS summary page 701 depicted in FIG. 7A. Notably, DTS summary page 730 includes quicklinks 732 to often used functions such as a communication link 732A, configured to, for example, send a report to an individual via email, a searching link 732B, configured to, for example, search a DTS database, and/or an overdue change indicator 732C, which in some embodiments, is configured to navigate a user to an overdue contact page and/or pop-up. Additionally, in the embodiment shown, a domain field 734 displays domain information associated with a particular change, a description field 736 includes description links configured to directing a user to a description page and/or pop-up including a description of the change and/or task. Furthermore, the filter 738 includes additional example filtering fields and both an export filter button 740A as well as a full export button 740B are provided. The export filter button 740A is configured for directing the user to an export preferences page and then exporting the information into an export page and/or an export document based on the user's inputs into the filter 738 and the export preferences page. In another embodiment, the export filter button 740A is configured for automatically producing an export page and/or export document based on predetermined and/or automatic preferences. Similarly, the full export button 740B, is configured for directing the user to an export preferences page and then producing an export page and/or export document in some embodiments, and in other embodiments, the full export button 740B, is configured for automatically generating an export page and/or document based on the un-filtered information of in the listing 702 of the DTS summary page 730.

Figure 7C:
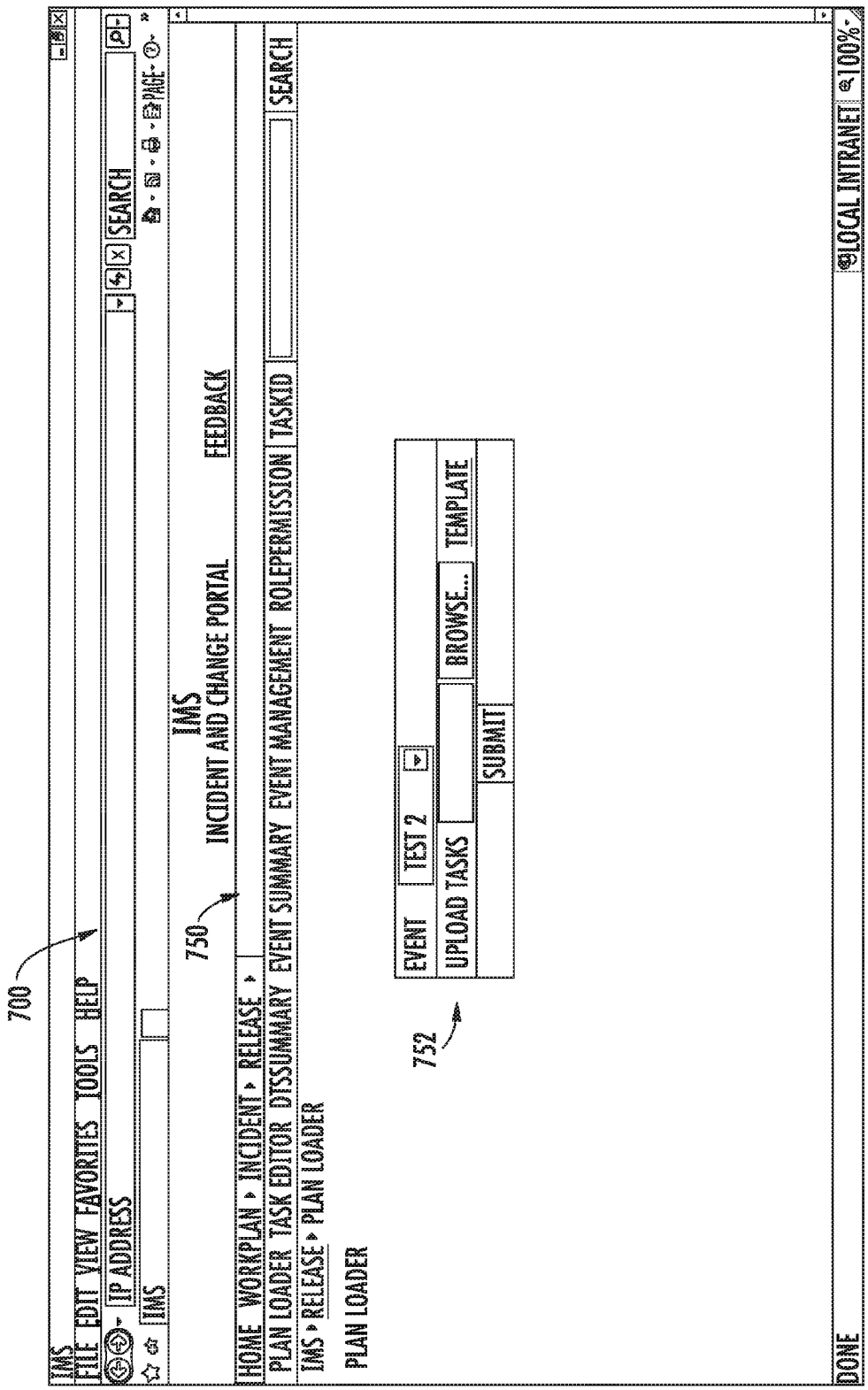

Referring now to FIG. 7C, a plan loader page 750 of the DTS interface 700 is shown. The plan loader page 750 includes a plan loading field 752 configured for receiving a change workplan from a user. In some instances, a release is scheduled well in advance of the actual release, and individuals in charge of various components or changes within a release configure their plans well before the actual release takes place. In this regard, some or all the change workplans are available for viewing from the DTS interface 700 before the release date. Further, as changes are made to the change workplans, new versions may be uploaded.

Figure 7D:
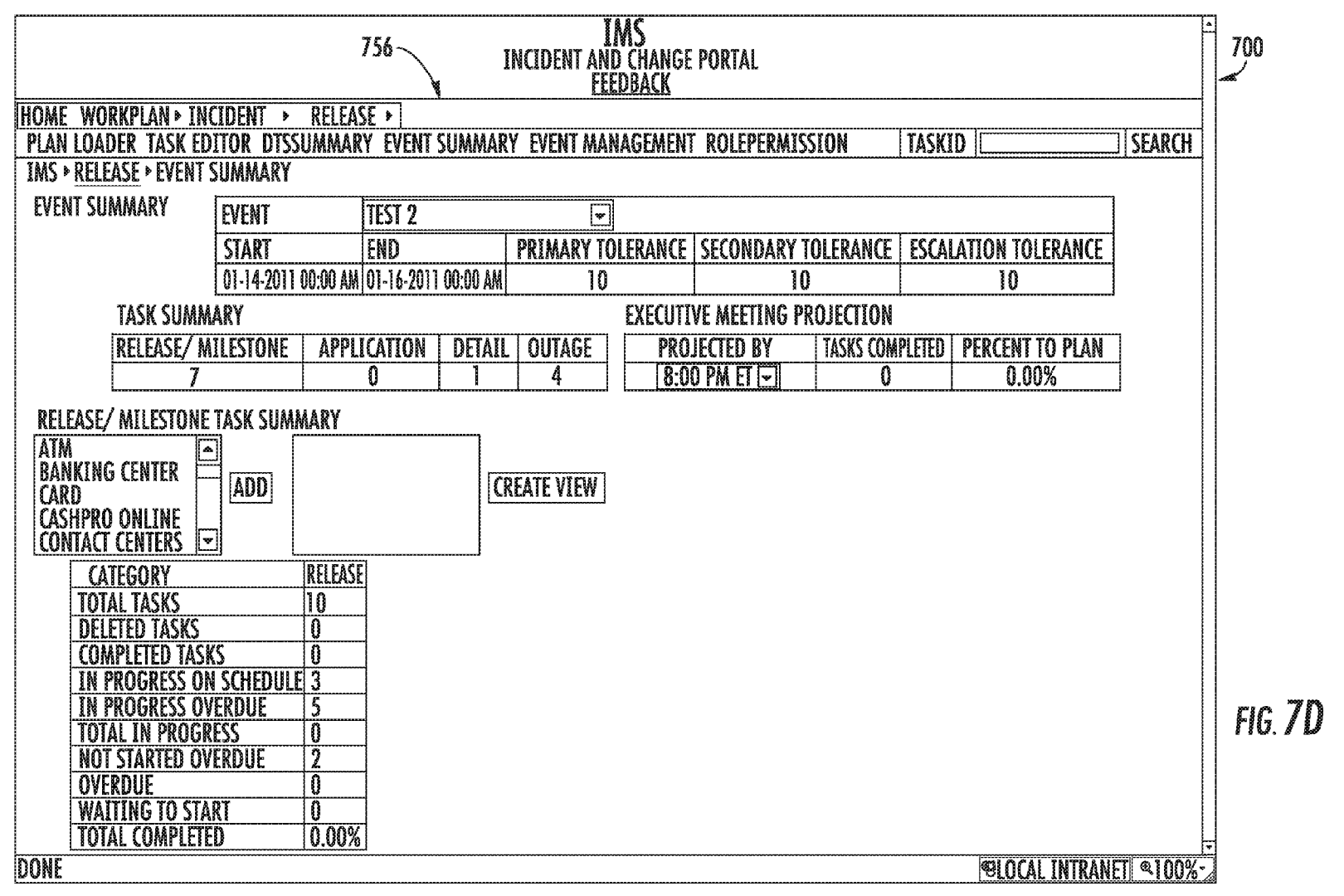

Referring now to FIG. 7D, an event summary page 756 of the DTS interface 700 is shown. The event summary page 756 includes information related to a specific event, which is also referred to herein as a change. For example, in the configuration shown, task and milestone details are provided, such as, number of task, status of tasks and percentage of tasks completed, among other information.

Figure 7F:
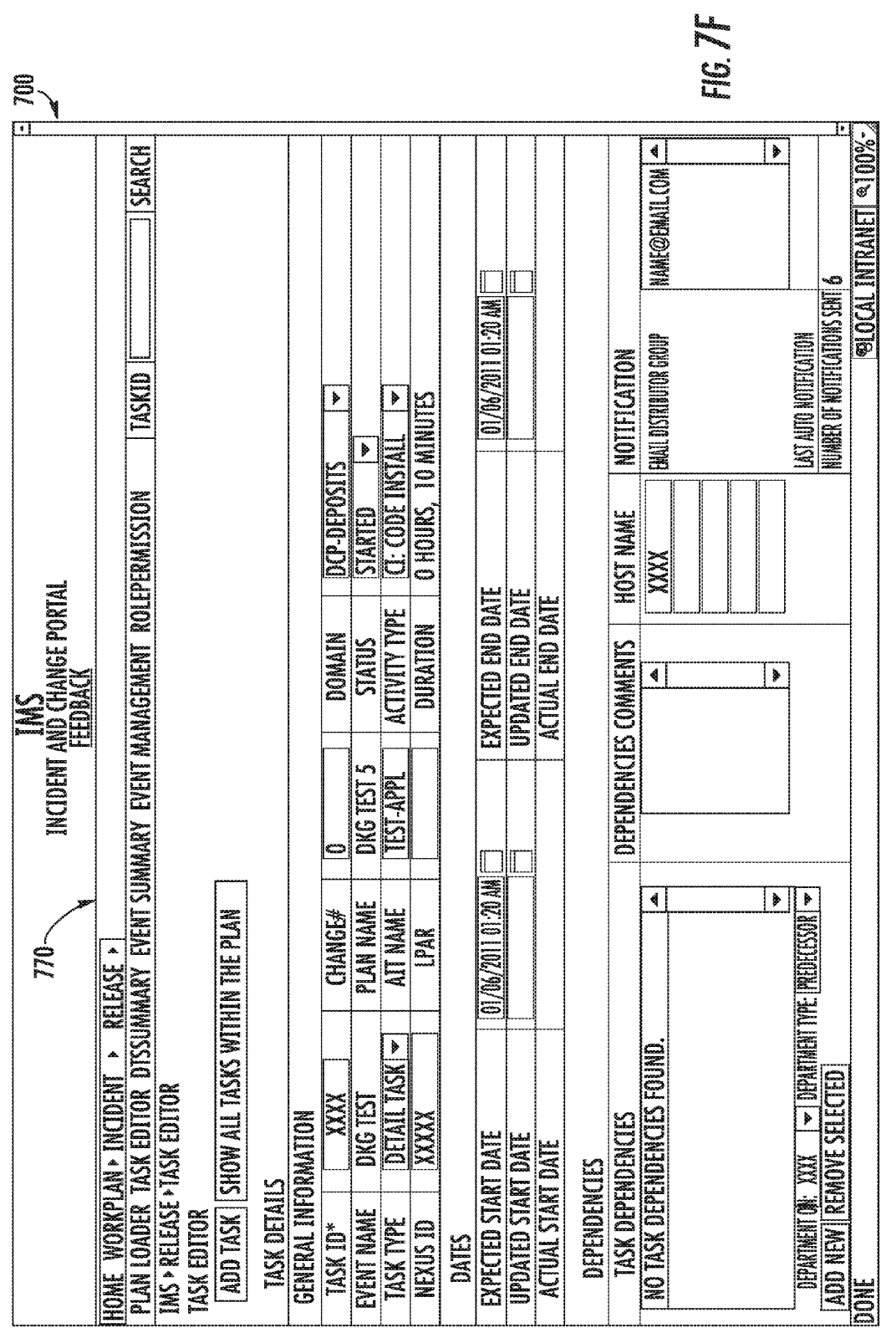

Referring now to FIG. 7E, an event management page 760 of the DTS interface 700 is shown. The event management page 760 includes, in the embodiment shown, an event listing 762 including selected information regarding each event or change in the listing 762, a domain information listing 764 configured for receiving user input regarding whether each particular domain is active with regard to a particular change. Furthermore, in the embodiment shown, a general information window 766 as well as a notifications settings by contact window 768 are provided. The general information window 766 is configured to receive user input regarding the event or change, and the notifications settings by contact window 768 is configured for receiving user input regarding notification with regard to the primary, secondary, escalation, and repeat escalation contacts. Referring now to FIG. 7F, a task detail page 770 of the DTS interface 700 is shown. The task detail page 770, in the embodiment shown, includes various detailed information with regard to a specific tasks associated with a change/event. In various embodiments of the DTS interface 700, users can be assigned different permissions. For example, in one embodiment, an administrator can assign access permission to the various users such as general access, restricted access or no access. In other embodiments, additional access permission parameters may be defined, thereby limited an individual's access to particular information through the DTS interface 700.

According to embodiments of the invention, a system and method manage information relating to a problem definition initiative in order to communicate some or all the information users. The method includes providing an interface users at workstations accessible by one or more of the users, receiving information comprising a plurality of messages from users communicating via the workstations during a problem definition initiative session, initiating display of at least one of the plurality of messages to the users via the interface, logging event data related to a plurality of events associated with the problem definition initiative session, and initiating display of at least some of the event data to the users via the interface.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor/processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A method for information management, by providing a centralized repository of real-time, current information, related to a problem definition initiative, the method comprising:

receiving, at the processing device of an Information Management System (IMS) from each of a plurality of workstations through a network, at least one of a plurality of messages from a plurality of users communicating during a real-time problem definition initiative conference session;

initiating, by the processing device of the IMS, a real-time problem application interface running on each of the plurality of workstations, whereby the real-time interface is presented to one or more of the plurality of users, the real-time interface comprising:
  a problem definition, wherein the problem definition comprises a plurality of events;
  a first portion of the plurality of users associated with the plurality of events participating in the conference session;
  a second portion of the plurality of users associated with the plurality of events who are not participating in the conference session; and
  at least a portion of each of the plurality of messages, wherein the portion of each of the plurality of messages is presented to each of the plurality of users at each of the plurality of workstations in real-time;
  wherein, each of the one or more plurality of users can be assigned different access permissions limiting the individual's access to information through the interface;

determining, by the processing device of the IMS, based on a textual analysis of message content of the plurality of messages from the plurality of users, that at least one of the plurality of events has occurred, the determining that the at least one of the plurality of events has occurred comprising determining, based on the textual analysis of the plurality of messages from the plurality of users, event data associated with the at least one of the plurality of events has occurred;

in response to determining that at least one of the plurality of events has occurred, automatically and in real-time, by the processing device of the IMS, logging event data related to the plurality of events associated with the problem definition initiative conference session, wherein event data further comprises at least one of data corresponding to an identification of a problem being addressed by the conference session, a status of the problem being addressed by the conference session, or a status of one or more solutions or solution steps proposed to address the problem;

archiving, by the processing device of the IMS, at least a portion of the logged event data, wherein the archived data is configured as searchable and retrievable data;

in response to determining that an event related to logged event data has occurred, automatically initiating, by the processing device of the IMS, communication of one or more alerts comprising information corresponding to the event; wherein determining that the event has occurred comprises:
  monitoring of the plurality of messages after logging event data;
  performing textual analysis of the plurality of messages to determine whether any significant events essential to problem definition initiative are discussed; and seeking confirmation from a user through a private message;

initiating, by the processing device of the IMS, a second problem application interface in response to a request from a user, the second interface configured for receiving a second plurality of messages from one or more of the plurality of users, wherein the second interface comprises:
 a plurality of required participants; and initiating, by the processing device of the IMS, preparation of a report based at least in part on at least a portion of the data corresponding to an identification of a problem being addressed by the conference session, a status of the problem being addressed by the conference session, or a status of one or more solutions or solution steps proposed to address the problem.

2. The method of claim 1, wherein the event data comprises data corresponding to one or more of the messages received from the users.

3. The method of claim 1, wherein the problem application interface comprises a first panel and a second panel, the first panel configured for displaying at least some of the event data and the second panel configured for displaying at least one of the plurality of messages.

4. The method of claim 1, wherein the plurality of messages comprises a dialogue among the plurality of users and wherein the event data corresponds to information about the dialogue, wherein logging the event data comprises logging data related to the dialogue and wherein initiating display of at least some of the event data comprises initiating display of at least a portion of the logged dialogue.

5. The method of claim 1 wherein archiving at least a portion of the logged event data further comprises archiving the logged event data at a database remote from the IMS.

6. The method of claim 1, wherein the initiating communication comprises one or more of initiating a pager alert, initiating a text message alert, initiating an email alert, initiating social media status update and initiating a social media message.

7. The method of claim 1, further comprising:
 initiating preparation of a report based at least in part on at least a portion of the logged event data or at least one of the received messages.

8. The method of claim 1, wherein the problem application interface comprises a first panel and a second panel, the first panel configured for displaying at least one of the plurality of messages and the second panel configured for displaying a list of users participating in the conference session.

9. The method of claim 1, wherein the problem application interface comprises a first panel, a second panel and a third panel, the first panel configured for displaying at least some of the event data, the second panel configured for displaying at least one of the plurality of messages, and the third panel configured for displaying a list of users participating in the conference session.

10. The method of claim 9, wherein the first panel is disposed on the left-hand side of the second panel and the third panel is disposed on the right-hand side of the second panel.

11. The method of claim 1, further comprising:
 retrieving archived data from a database in response to a request from a user participating in the conference session, the archived data corresponding to a previously conducted conference session.

12. The method of claim 1, further comprising logging session data related to the conference session and initiating display of at least some of the session data via the interface.

13. A system for managing information, by providing a centralized repository of real-time, current information, relating to a problem definition initiative in order to communicate some or all the information to a plurality of users, the system comprising a processing device of an information Management System (IMS) configured for:
 providing a real-time problem application interface running on each of a plurality of workstations, whereby the real-time interface is presented to a plurality of users;
 receiving, from each of the plurality of workstations through a network, at least one of a plurality of messages from users communicating during a real-time problem definition initiative conference session;
 initiating display of at least one of the plurality of messages to the users via the interface, the real-time interface further comprising:
  a problem definition, wherein the problem definition comprises a plurality of events;
  a first portion of the plurality of users associated with the plurality of events participating in the conference session;
  a second portion of the plurality of users associated with the plurality of events who are not participating in the conference session; and
  at least a portion of each of the plurality of messages, wherein the portion of each of the plurality of messages is presented to each of the plurality of users at each of the plurality of workstations in real-time;
  wherein, each of the one or more plurality of users can be assigned different access permissions limiting the individual's access to information through the interface;
 determining based on a textual analysis of message content of the plurality of messages from the plurality of users, that at least one of the plurality of events has occurred, the determining that the at least one of the plurality of events has occurred comprising determining, based on the textual analysis of the plurality of messages from the plurality of users, event data associated with the at least one of the plurality of events has occurred;
 in response to determining that at least one of the plurality of events has occurred, automatically and in real-time, logging event data related to a plurality of events associated with the problem definition initiative session, wherein event data further comprises at least one of data corresponding to an identification of a problem being addressed by the conference session, a status of the problem being addressed by the conference session, or a status of one or more solutions or solution steps proposed to address the problem
 archiving, at least a portion of the logged event data, wherein the archived data is configured as searchable and retrievable data;
 in response to determining that an event related to logged event data has occurred, automatically initiating, communication of one or more alerts comprising information corresponding to the event; wherein determining that the event has occurred comprises:
  monitoring of the plurality of messages after logging event data;
  performing textual analysis of the plurality of messages to determine whether any significant events essential to problem definition initiative are discussed; and
  seeking confirmation from a user through a private message;
 initiating, a second problem application interface in response to a request from a user, the second interface configured for receiving a second plurality of messages from one or more of the plurality of users, wherein the second interface comprises:
a plurality of required participants; and
initiating preparation of a report based at least in part on at least a portion of the data corresponding to an identification of a problem being addressed by the conference session, a status of the problem being addressed by the conference session, or a status of one or more solutions or solution steps proposed to address the problem.

14. The system of claim 13, wherein the event data comprises data corresponding to one or more messages received from one or more users.

15. The system of claim 13, wherein the problem application interface comprises a first panel and a second panel, the first panel configured for displaying at least some of the event data and the second panel configured for displaying at least one of the plurality of messages.

16. The system of claim 13, wherein the plurality of messages comprises a dialogue among the plurality of users and wherein the event data corresponds to information about the dialogue, wherein logging the event data comprises logging data related to the dialogue and wherein initiating display of at least some of the event data comprises initiating display of at least a portion of the logged dialogue.

17. The system of claim 13, wherein archiving at least a portion of the logged event data further comprises archiving the logged event data at a database remote from the IMS.

18. The system of claim 13, wherein initiating communication comprises one or more of initiating a pager alert, initiating a text message alert, initiating an email alert, initiating social media status update and initiating a social media message.

19. The system of claim 13, wherein the processing device of the IMS is further configured for initiating preparation of a report based at least in part on at least a portion of the logged event data or at least one of the received messages.

20. The system of claim 13, wherein the problem application interface comprises a first panel and a second panel, the first panel configured for displaying at least one of the plurality of messages and the second panel configured for displaying a list of users participating in the conference session.

21. The system of claim 13, wherein the problem application interface comprises a first panel, a second panel and a third panel, the first panel configured for displaying at least some of the event data, the second panel configured for displaying at least one of the plurality of messages, and the third panel configured for displaying a list of users participating in the conference session.

22. The system of claim 21, wherein the first panel is disposed on the left-hand side of the second panel and the third panel is disposed on the right-hand side of the second panel.

23. The system of claim 13, wherein the processing device is further configured for:
retrieving archived data from a database in response to a request from a user participating in the conference session, the archived data corresponding to a previously conducted conference session.

24. The system of claim 13, wherein the processing device is further configured for logging session data related to the conference session and initiating display of at least some of the session data via the interface.

25. A computer program product comprising a non-transient computer-readable memory comprising computer-executable instructions for use in information management, by providing a centralized repository of real-time, current information, relating to a problem definition initiative, the instructions comprising:
instructions for providing a real-time problem application interface running on each of a plurality of workstations, whereby the real-time interface is presented to a plurality of users;
instructions for receiving information, from each of the plurality of workstations through a network, comprising a plurality of messages from users communicating during a real-time problem definition initiative session;
instructions for initiating display of at least one of the plurality of messages to the users via the interface, the real-time interface further comprising:
a problem definition, wherein the problem definition comprises a plurality of events;
a first portion of the plurality of users associated with the plurality of events participating in the conference session;
a second portion of the plurality of users associated with the plurality of events who are not participating in the conference session; and
at least a portion of each of the plurality of messages, wherein the portion of each of the plurality of messages is presented to each of the plurality of users at each of the plurality of workstations in real-time;
wherein, each of the one or more plurality of users can be assigned different access permissions limiting the individual's access to information through the interface;
instructions for determining, based on a textual analysis of message content of the plurality of messages from the plurality of users, that at least one of the plurality of events has occurred, the determining that the at least one of the plurality of events has occurred comprising determining, based on the textual analysis of the plurality of messages from the plurality of users, event data associated with the at least one of the plurality of events has occurred;
instructions for automatically and in real-time, logging event data related to a plurality of events associated with the problem definition initiative session, in response to determining that at least one of the plurality of events has occurred, wherein event data further comprises at least one of data corresponding to an identification of a problem being addressed by the conference session, a status of the problem being addressed by the conference session, or a status of one or more solutions or solution steps proposed to address the problem
instructions for archiving at least a portion of the logged event data, wherein the archived data is configured as searchable and retrievable data;
instructions for determining that an event related to logged event data has occurred, and in response, automatically initiating, communication of one or more alerts comprising information corresponding to the event; wherein instructions for determining that the event has occurred comprise:
monitoring of the plurality of messages after logging event data;
performing textual analysis of the plurality of messages to determine whether any significant events essential to problem definition initiative are discussed; and
seeking confirmation from a user through a private message;
instructions for initiating a second problem application interface in response to a request from a user, the second interface configured for receiving a second plurality of messages from one or more of the plurality of users, wherein the second interface comprises:
a plurality of required participants; and
instructions for initiating preparation of a report based at least in part on at least a portion of the data corresponding to an identification of a problem being addressed by the conference session, a status of the problem being addressed by the conference session, or a status of one or more solutions or solution steps proposed to address the problem.

26. The computer program product of claim 25, wherein the event data comprises data corresponding to one or more messages received from one or more users.

27. The computer program product of claim 25, wherein the problem application interface comprises a first panel and a second panel, the first panel configured for displaying at least some of the event data and the second panel configured for displaying at least one of the plurality of messages.

28. The computer program product of claim 25, wherein the plurality of messages comprises a dialogue among the plurality of users and wherein the event data corresponds to information about the dialogue, wherein the instructions for logging the event data comprise instructions for logging data related to the dialogue and wherein the instructions for initiating display of at least some of the event data comprise instructions for initiating display of at least a portion of the logged dialogue.

29. The computer program product of claim 25, wherein the instructions for archiving at least a portion of the logged event data further comprise instructions for archiving the logged event data at a database remote from an Information Management System.

30. The computer program product of claim 25, wherein the instructions for initiating communication comprise one or more of instructions for initiating a pager alert, instructions for initiating a text message alert, instructions for initiating an email alert, instructions for initiating social media status update and instructions for initiating a social media message.

31. The computer program product of claim 25, wherein the instructions further comprise:
instructions for initiating preparation of a report based at least in part on at least a portion of the logged event data or at least one of the received messages.

32. The computer program product of claim 25, wherein the problem application interface comprises a first panel and a second panel, the first panel configured for displaying at least one of the plurality of messages and the second panel configured for displaying a list of users participating in the conference session.

33. The computer program product of claim 25, wherein the problem application interface comprises a first panel, a second panel and a third panel, the first panel configured for displaying at least some of the event data, the second panel configured for displaying at least one of the plurality of messages, and the third panel configured for displaying a list of user participating in the conference session.

34. The computer program product of claim 33, wherein the first panel is disposed on the left-hand side of the second panel and the third panel is disposed on the right-hand side of the second panel.

35. The computer program product of claim 25, wherein the instructions further comprise instructions for retrieving archived data from a database in response to a request from a user participating in the conference session, the archived data corresponding to a previously conducted conference session.

36. The computer program product of claim 25, wherein the instructions further comprise:
instructions for logging session data related to the conference session and initiating display of at least some of the session data via the interface.

37. A method for managing information, by providing a centralized repository of real-time, current information, relating to a problem definition initiative in order to communicate some or all the information to a plurality of users, the method comprising:
receiving, at the processing device of an Information Management System (IMS) from each of a plurality of workstations through a network, at least one of a plurality of messages from a plurality of users communicating during a real-time problem definition initiative session, the plurality of messages comprising a dialogue among the plurality of users;
initiating, by the processing device of the IMS, a real-time problem application interface running on each of the plurality of workstations, whereby the real-time interface is presented to one or more of the plurality of users, the real-time interface further comprising:
a problem definition, wherein the problem definition comprises a plurality of events;
a first portion of the plurality of users associated with the plurality of events participating in the conference session;
a second portion of the plurality of users associated with the plurality of events who are not participating in the conference session; and
at least a portion of each of the plurality of messages, wherein the portion of each of the plurality of messages is presented to each of the plurality of users at each of the plurality of workstations in real-time;
wherein, each of the one or more plurality of users can be assigned different access permissions limiting the individual's access to information through the interface;
determining, by the processing device of the IMS, based on a textual analysis of message content of the plurality of messages from the plurality of users, that at least one of the plurality of events has occurred, the determining that the at least one of the plurality of events has occurred comprising determining, based on the textual analysis of the plurality of messages from the plurality of users, event data associated with the at least one of the plurality of events has occurred;
in response to determining that at least one of the plurality of events has occurred, automatically and in real-time, by the processing device of the IMS, logging event data related to a plurality of events associated with the problem definition initiative session, the event data comprising data corresponding to one or more messages received from one or more users during the dialogue;
logging session data comprising data corresponding to an identification of a problem being addressed by the conference session, a status of the problem being addressed by the conference session, or a status of one or more solutions or solution steps proposed to address the problem
archiving, by the processing device of the IMS, at least a portion of the logged event data, wherein the archived data is configured as searchable and retrievable data during the conference session;
in response to determining that an event related to logged event data has occurred, automatically initiating, by the processing device of the IMS, communication of one or more alerts comprising information corresponding to the event; wherein determining that the event has occurred comprises:
- monitoring of the plurality of messages after logging event data;
- performing textual analysis of the plurality of messages to determine whether any significant events essential to problem definition initiative are discussed; and
- seeking confirmation from a user through a private message;

initiating, by the processing device of the IMS, a second problem application interface in response to a request from a user, the second interface configured for receiving a second plurality of messages from one or more of the plurality of users, wherein the second interface comprises:
- a plurality of required participants; and wherein initiating presentation of the interface further comprises:
- initiating preparation of a report based at least in part on at least a portion of the data corresponding to an identification of a problem being addressed by the conference session, a status of the problem being addressed by the conference session, or a status of one or more solutions or solution steps proposed to address the problem.

38. The method of claim 37, wherein the initiating communication comprises one or more of initiating a pager alert, initiating a text message alert, initiating an email alert, initiating social media status update and initiating a social media message.

39. The method of claim 37, further comprising:
initiating preparation of a report based at least in part on at least a portion of the logged event data or at least one of the received messages.

40. The method of claim 37, wherein the problem application interface comprises a first panel, a second panel and a third panel, the first panel configured for displaying at least some of the event data, the second panel configured for displaying at least one of the plurality of messages, and the third panel configured for displaying a list of users participating in the conference session.

41. The method of claim 37, further comprising:
initiating preparation of a report based at least in part on at least a portion of the logged event data or at least one of the received messages.

42. A system for managing information, by providing a centralized repository of real-time, current information, relating to a problem definition initiative, the system comprising a processing device of an information Management System (IMS) configured for:
receiving, from each of a plurality of workstations through a network, at least one of a plurality of messages from a plurality of users communicating during a real-time problem definition initiative session, the plurality of messages comprising a dialogue among the plurality of users;
initiating a real-time problem application interface running on each of the plurality of workstations, whereby the real-time interface is presented to one or more of the plurality of users, the real-time interface further comprising:
- a problem definition, wherein the problem definition comprises a plurality of events;
- a first portion of the plurality of users associated with the plurality of events participating in the conference session;
- a second portion of the plurality of users associated with the plurality of events who are not participating in the conference session; and
- at least a portion of each of the plurality of messages, wherein the portion of each of the plurality of messages is presented to each of the plurality of users at each of the plurality of workstations in real-time;
- wherein, each of the one or more plurality of users can be assigned different access permissions limiting the individual's access to information through the interface;

determining, based on a textual analysis of message content of the plurality of messages from the plurality of users, that at least one of the plurality of events has occurred, the determining that the at least one of the plurality of events has occurred comprising determining, based on the textual analysis of the plurality of messages from the plurality of users, event data associated with the at least one of the plurality of events has occurred;

in response to determining that at least one of the plurality of events has occurred, automatically and in real-time, logging event data related to a plurality of events associated with the problem definition initiative conference session, the event data comprising data corresponding to one or more messages received from one or more users during the dialogue;

logging session data comprising data corresponding to an identification of a problem being addressed by the conference session, a status of the problem being addressed by the conference session, or a status of one or more solutions or solution steps proposed to address the problem;

archiving at least a portion of the logged event data, wherein the archived data is configured as searchable and retrievable data, during the conference session;

in response to determining that an event related to logged event data has occurred, automatically initiating, communication of one or more alerts comprising information corresponding to the event; wherein determining that the event has occurred comprises:
- monitoring of the plurality of messages after logging event data;
- performing textual analysis of the plurality of messages to determine whether any significant events essential to problem definition initiative are discussed; and
- seeking confirmation from a user through a private message;

initiating, a second problem application interface in response to a request from a user, the second interface configured for receiving a second plurality of messages from one or more of the plurality of users, wherein the second interface comprises:
- a plurality of required participants; and wherein initiating presentation of the interface further comprises:
- initiating preparation of a report based at least in part on at least a portion of the data corresponding to an identification of a problem being addressed by the conference session, a status of the problem being addressed by the conference session, or a status of one or more solutions or solution steps proposed to address the problem.

43. The system of claim 42, wherein initiating communication comprises one or more of initiating a pager alert, initiating a text message alert, initiating an email alert, initiating social media status update and initiating a social media message.

44. The system of claim 42, wherein the processing device is further configured for:
  initiating preparation of a report based at least in part on at least a portion of the logged event data or at least one of the received messages.

* * * * *